United States Patent [19]
Neff et al.

[11] Patent Number: 5,541,759
[45] Date of Patent: Jul. 30, 1996

[54] SINGLE FIBER TRANSCEIVER AND NETWORK

[75] Inventors: Gregory E. Neff, Whitby; Glenn M. G. Moore, Scarborough, both of Canada

[73] Assignee: Microsym Computers, Inc., Scarborough, Canada

[21] Appl. No.: 437,775

[22] Filed: May 9, 1995

[51] Int. Cl.⁶ .................................................. H04B 10/00
[52] U.S. Cl. ............................ 359/152; 359/119; 359/110; 370/32
[58] Field of Search ........................ 359/110, 119, 359/135, 152–153, 161–162, 166, 173, 179, 186; 370/32; 371/20.2

[56] References Cited

U.S. PATENT DOCUMENTS

| | | | |
|---|---|---|---|
| 4,366,565 | 12/1982 | Herskowitz | 370/1 |
| 4,502,753 | 3/1985 | Flocon | 350/96.16 |
| 4,675,545 | 6/1987 | Takahashi | 307/265 |
| 4,730,301 | 3/1988 | McMahon | 370/2 |
| 4,821,297 | 4/1989 | Bergmann et al. | 375/120 |
| 4,847,831 | 7/1989 | Spiesman et al. | 370/97 |
| 4,850,045 | 7/1989 | Funke | 455/607 |
| 4,881,041 | 11/1989 | Kawanabe et al. | 328/112 |
| 4,937,811 | 6/1990 | Harris | 370/5 |
| 4,973,953 | 11/1990 | Shimokawa et al. | 359/119 |
| 5,003,531 | 3/1991 | Farinholt et al. | 370/16.1 |
| 5,058,101 | 10/1991 | Albanese et al. | 359/127 |
| 5,060,224 | 10/1991 | Konishi | 359/119 |
| 5,060,303 | 10/1991 | Wilmoth | 359/152 |
| 5,105,293 | 4/1992 | Bortolini | 359/154 |
| 5,119,224 | 6/1992 | Smith | 359/153 |
| 5,121,241 | 6/1992 | Veith | 359/152 |
| 5,138,475 | 8/1992 | Bergmann et al. | 359/118 |
| 5,220,581 | 6/1993 | Ferraiolo et al. | 375/10 |
| 5,239,481 | 8/1993 | Brooks et al. | 364/486 |
| 5,253,096 | 10/1993 | Freeman et al. | 359/184 |
| 5,278,824 | 1/1994 | Kremer | 370/15 |
| 5,307,195 | 4/1994 | Nicole | 359/156 |
| 5,307,353 | 4/1994 | Yamashita et al. | 371/11.2 |
| 5,309,475 | 5/1994 | Dzieduszko | 375/3 |
| 5,313,057 | 5/1994 | Nakajima | 250/214 |
| 5,319,488 | 6/1994 | Ishiwatari | 359/174 |

(List continued on next page.)

FOREIGN PATENT DOCUMENTS

| | | |
|---|---|---|
| 1253332 | 10/1989 | Canada . |
| 2089995 | 10/1993 | Canada . |
| 2098343 | 12/1993 | Canada . |
| 2096151 | 1/1994 | Canada . |
| 2107633 | 4/1994 | Canada . |
| 77232 | 4/1983 | European Pat. Off. . |

*Primary Examiner*—Leo Boudreau
*Assistant Examiner*—Kinfe-Michael Negash
*Attorney, Agent, or Firm*—Fitzpatrick, Cella, Harper & Scinto

[57] ABSTRACT

A single fiber transceiver is for use in a node of a single fiber network. The transceiver repeats signals received from one node to the next node. The node may have a processor, such as a sensor or controller, connected to the transceiver for receiving signals from the network or transmitting signals onto the network. The transceiver has a receiver and associated receive data path logic and has a transmitter and associated transmission data path logic. It also has a jam detection circuit, a pulse width compensation circuit, a phase locked loop, a weak link detection circuit and an anti-recirculation timer. The jam detection circuit cuts off nodes that transmit overly long packets to prevent the remainder of the network from becoming jammed. Before a received pulse is repeated, the pulse width compensation circuit reconstitutes each data pulse from the leading edge of the pulse in order to limit degradation of the signal as it is transmitted about the network. The phase locked loop brings the received pulse closer to phase with the local clock to limit the effect of jitter on the pulse. The weak link detector detects a decrease in the received amplitude of serial data, a measure of the integrity of the fiber link. The anti-recirculation timer prevents recirculation of pulse that have already been transmitted around the network by locking out repetition of received signals for a given period after an end of packet code.

29 Claims, 21 Drawing Sheets

U.S. PATENT DOCUMENTS

| | | | |
|---|---|---|---|
| 5,367,397 | 11/1994 | Tajima | 359/152 |
| 5,371,763 | 12/1994 | Ota et al. | 375/76 |
| 5,373,387 | 12/1994 | Bosch et al. | 359/187 |
| 5,390,038 | 2/1995 | Cecchini | 359/179 |
| 5,396,357 | 3/1995 | Goossen et al. | 359/119 |
| 5,396,569 | 3/1995 | Yanagawa et al. | 385/24 |
| 5,406,401 | 4/1995 | Kremer | 359/110 |
| 5,408,350 | 4/1995 | Perrier et al. | 359/168 |

EXAMPLE PULSE WIDTH DISTORTION COMPENSATION WAVEFORMS

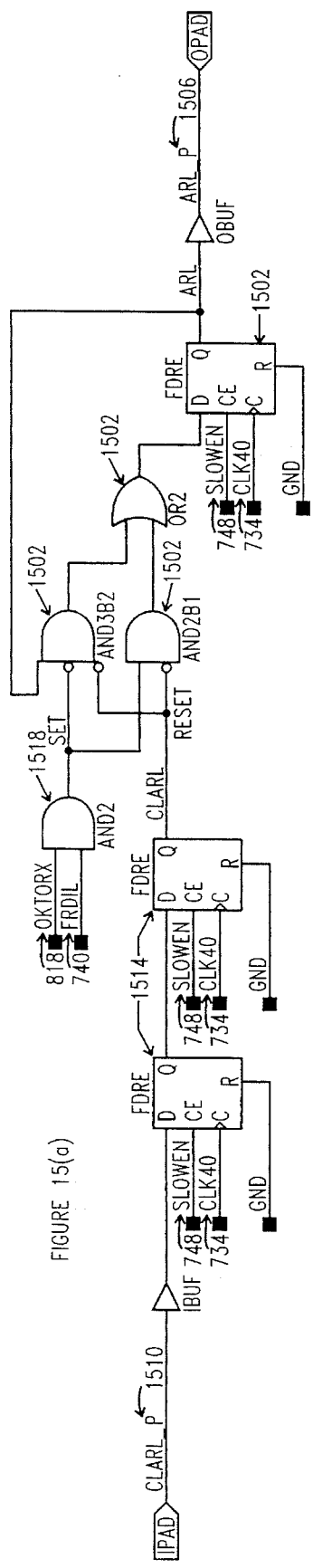
FIGURE 15(a)
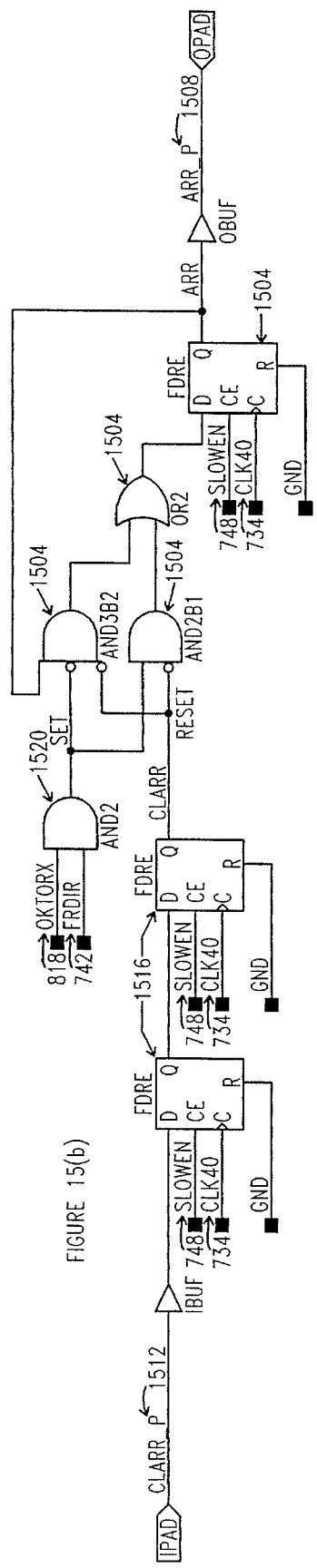
FIGURE 15(b)
FIGURE 15

SINGLE FIBER TRANSCEIVER AND NETWORK

FIELD OF THE INVENTION

This invention relates to single fiber transceivers and networks. More particularly, it relates to such transceivers and networks that include pulse width distortion compensation means, phase locked loop jitter reduction means, anti-recirculation means, and weak link detection means.

BACKGROUND OF THE INVENTION

Distributed control networks, operating over various media, are becoming more prevalent as the cost of these systems comes down, and the capability and reliability of these systems improve. It has become desirable to be able to provide a low-cost, fault-tolerant, robust, compact fiber optic transceiver for such distributed control systems, especially in applications requiring the well-known benefits of fiber optics. Applications for such systems include industrial controls where high electrical noise levels exist, where high voltage differentials exits, or where information must be communicated through hazardous locations. Transportation systems require high noise immunity, small size, and light weight. Building automation systems require lightning immunity when passing between buildings. Security systems require communications paths that do not unintentionally radiate confidential data. Alarm and protection systems require fault tolerance and fault detection capabilities. To allow fiber optics to be used practically in these applications, the apparatus and means disclosed herein were invented.

Receiver power level monitoring, otherwise known as "weak link detection", typically requires diagnostic equipment, diagnostic optics, diagnostic data, and/or diagnostic software in order to monitor operations and/or receive power level. For example, Canadian Pat. No. 2,089,995 discloses a system that monitors signal integrity utilizing infra-red transceiver components, but this system requires local optical feedback (which is expensive for fiber optic transceivers), and it fails to test the integrity of the communications path between a transmitter in one node to the intended receiver in a different node. U.S. Pat. No. 5,220,581 discloses a method whereby the magnitude of the jitter in the received data is captured using non-sequential sorting logic to determine the number of events in each sort counter. Although this method will achieve the desired result, it requires a significant amount of logic to implement the multiple counters and comparators. U.S. Pat. No. 5,396,357 discloses a method whereby the noise output from a discriminator is measured to determine the relative health of the fiber link. Again this requires substantial circuitry to capture and measure the noise in the receiver. Note that "weak link detection" in the context of this description refers to low optical power as measured at a fiber optic receiver, and this should not be confused with weak links in semiconductor and superconductor structures.

Prior art in pulse width distortion compensation disclose less than ideal correction means. For example, U.S. Pat. No. 5,309,475 discloses a mechanism whereby each node inverts the data being repeated, so the pulse width distortion at each node, which is presumed to be consistent, will cancel through inversion. Unfortunately, the magnitude of pulse width distortion is often inconsistent between nodes, since the magnitude of pulse width distortion can be proportional to the amplitude of the receive optical power at each node. Varying cable length between nodes can result in asymmetrical pulse width distortion, which will also reduce the effectiveness of this correction scheme. U.S. Pat. No. 4,881,041 proposes a feedback correction mechanism that depends on averaging "the direct current component" of the receive pulse widths, and adjusting the receive pulse width until the average pulse width is returned to the nominal 50% level. This method assumes that the average pulse width is 50%, which is not valid if the network is quiet. The DC component in this case will drift to an unacceptably low level, so that when data begins to be received again the pulse width will be unacceptably distorted until the integrator recovers. U.S. Pat. No. 4,675,545 discloses a method where a leading edge detector initiates a sequence where the receive data is sampled one-quarter bit time after the leading edge is detected, and then sampled in one-half bit intervals. The correction range of this method allows for pulse width distortion that is up to ±50% of nominal. Unfortunately this method has two major drawbacks. The first is that it introduces a ¼ bit delay in the repeating of data, regardless of the magnitude of the pulse width distortion. If a large number of nodes are present on a network, then this can significantly add to the propagation delay of a packet around the network. Also, certain fiber optic receivers, including the fiber optic receiver disclosed herein, exhibit pulse width distortion in one direction only, and the magnitude of the pulse width distortion can exceed 50% at high power levels. Therefore the method of U.S. Pat. No. 4,675,545 may result in data errors when receivers are subject to high input optical power.

Although U.S. Pat. No. 5,220,581 recognizes signal jitter as a potential benefit in detecting a weak link, the fact remains that signal jitter when accumulated through nodes in a network may result in data errors.

Since the network can be configured in a loop topology, a means is required to prevent recirculation of packets around a network.

It is an object of the invention to address these or other problems with single fiber transceivers and networks.

SUMMARY OF THE INVENTION

In a first aspect the invention provides a single fiber transceiver for use in a first node connected to a second node and a third node in a loop topology network communicating with serial data encoded in packets with an end of packet code. Tho transceiver has a single fiber first receiver for receiving serial data from the second node. It also has receive data path logic. The first receiver is also for passing received serial data to the receive data path logic. The receive data path logic is for determining if the serial data received from the first receiver is valid. The transceiver also has transmit data path logic. The receive data path logic is also for passing valid serial data to the transmit data path logic. The transceiver also has a single fiber first transmitter for transmitting serial data. The transmit data path logic passes the valid serial data to the first transmitter and enables the first transmitter to transmit the valid serial data to the third node. The transceiver also has an anti-recirculation timer for preventing the receiver data path logic from passing valid serial data within a given period of time greater than a maximum amount of time that serial data takes to circulate once about the loop network following receipt of an end of packet code The transceiver may also be for connection to a processor for transmitting serial data to the transmit data path logic. In such a case the anti-recirculation timer is further for preventing the receiver data path logic from passing valid serial data within a given period of time greater than a maximum amount of time that serial data takes to circulate about the loop network following transmission of an end of packet code to the transmit data path logic.

In a second aspect the invention provides a single fiber transceiver for use in a first node connected to a second node and a third node in a network communicating with serial data encoded in such a way as to have known pulse width relative to the bit period. The transceiver has a single fiber first receiver for receiving serial data from the second node. It also has receive data path logic. The first receiver is also for passing received serial data to the receive data path logic. The receive data path logic is for determining if the serial data received from the first receiver is valid. The transceiver also has transmit data path logic. The receive data path logic is for passing valid serial data to the transmit data path logic. The transceiver also has a single fiber first transmitter for transmitting serial data. The transmit data path logic is for passing the valid serial data to the first transmitter and enabling the first transmitter to transmit data to the third node. The transceiver also has a pulse width distortion compensation circuit for recognizing a leading edge of a received pulse of serial data, sampling the serial data at multiples of one-half of the bit period from recognition of the pulse until a new leading edge, and reconstructing the serial data according to the samples. In a third aspect the invention provides a single fiber transceiver for use in a first node connected to a second node and a third node in a network communicating with serial data encoded in such a way as to have known pulse width relative to the bit period. The transceiver has a single fiber first receiver for receiving serial data from the second node. It also has receive data path logic. The first receiver is also for passing received serial data to the receive data path logic. The receiver data path logic is for determining if the serial data received from the first receiver is valid. The transceiver also has transmit data path logic. The receive data path logic is also for passing valid serial data to the transmit data path logic. The transceiver also has a single fiber first transmitter for transmitting serial data. The transmit data path logic is for passing the valid serial data to the first transmitter and enabling the first transmitter to transmit data to the third node. The transceiver also has a weak link detection circuit for determining the optical power at the receiver by converting the amplitude of the received serial data to a corresponding amount of pulse width distortion introduced into the received data and measuring the magnitude of the distortion. In a fourth aspect the invention provides a single fiber transceiver for use in a first node connected to a second node and a third node in a network communicating with serial data encoded in such a way as to have known a bit rate. The transceiver has a single fiber first receiver for receiving serial data from the second node. It also has receive data path logic. The first receiver is also for passing received serial data to the receive data path logic. The receive data path logic is for determining if the serial data received from the first receiver is valid. The transceiver also has transmit data path logic. The receive data path logic is also for passing valid serial data to the transmit data path logic. The transceiver also has a single fiber first transmitter for transmitting serial data. The transmit data path logic is for passing the valid serial data to the first transmitter and enabling the first transmitter to transmit data to the third node. The transceiver also has a phase locked loop for removing jitter from the received serial data by using a local frequency generator to sample the received data and to regenerate the data based on the samples of the received data. The frequency generator provides feedback signals to phase detectors that compare the phase of the frequency generator to the phase of the received data and can accordingly force the frequency generator to adjust its phase to more closely match that of the received data.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 15 is a logic diagram of an any receive detection circuit of the transceiver of FIG. 4.

DETAILED DESCRIPTION OF THE PREFERRED EMBODIMENT

NETWORK TOPOLOGY OVERVIEW

Figure 1A:
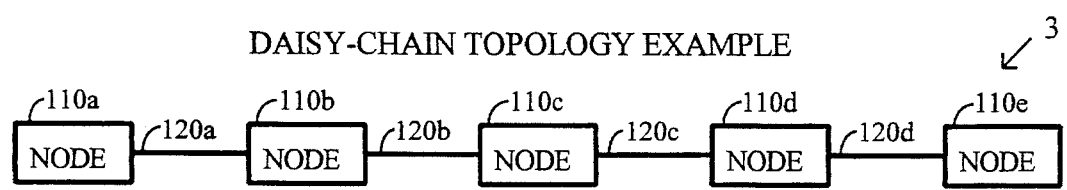
FIG. 1(a) is a block diagram of a single fiber network arranged in a daisy-chain topology.
Figure 1B:
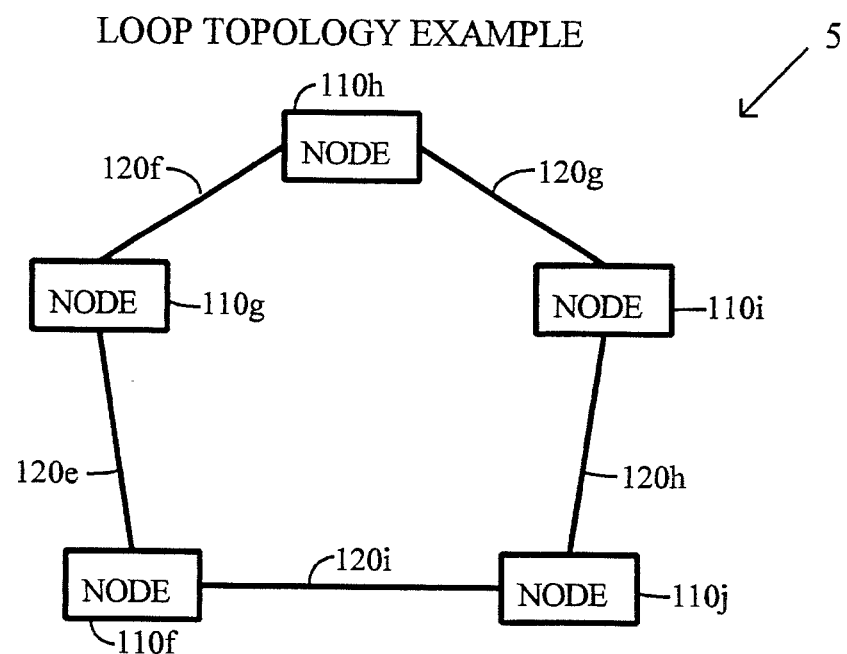
FIG. 1(b) is a block diagram of a single fiber network arranged in a loop topology.

Referring to FIGS. 1(a) and 1(b), an SFT (Single Fiber Transceiver) is to be used in a daisy-chain topology network 3, and a loop topology network 5 as illustrated in FIG. 1(b).

Single fiber networks include a plurality of nodes which are interconnected by a plurality of fiber optic cables. For example, in FIG. 1(a) nodes 110a through 110e are interconnected using fiber optic cables 120a through 120d. Only a single fiber optic strand is required to interconnect any two nodes, so all fiber optic cables referred to in this disclosure need only to be single strand cables. The fiber optic cables terminate at each node. It is the responsibility of each node to convert received optical data to an electrical signal, to regenerate the data from the electrical signal, and to convert this to optical data again. Thus each node repeats the signal from the receiving fiber optic cable to the fiber optic cable on the opposite side of the node.

Data may flow along the fiber optic cable in two directions in a half-duplex fashion. The node that originates a network packet will transmit the message out both sides of the node. The nodes on either side of the originating node will detect the network packet and repeat the message. The message will continue to be repeated along the network, flowing away from the originating node in both directions. In a daisy-chain topology the nodes at the ends of the network will also attempt to repeat the data, but since there are no fiber optic cables at each end the repeated optical data is no longer propagated. For example, referring to FIG. 1(c), when node 110c originates a message it will simultaneously transmit the message to nodes 110b and 110d. Nodes 110b and 110d will then repeat the message to nodes 110a and 110e respectively. The same rule holds true for loop topology networks. For example, referring to FIG. 1(b), when node 110h originates a message it will simultaneously transmit the message to both nodes 110g and 110i. Nodes 110g and 110i will then repeat the message to nodes 110f and 110j respectively. In this case node 110f will attempt to repeat the message to node 110j at the same time that node 110j attempts to repeat the message to node 110f. This results in an optical collision on fiber optic cable 120i. This collision does not result in data loss, since all nodes are receiving the message on fiber segments other than this one.

The fiber optic cables used for the single fiber network are industry standard, and many different types of cables can be used depending on the specific application requirements. The methods and means for selecting and installing these fiber optic cables are well known. Although the single fiber transceiver requires only single strand cables, it is obvious the multiple strand cables can be used as well, with the single fiber transceiver using only one of the strands in the multi-strand cable.

SINGLE FIBER NODE OVERVIEW

Each node in a single fiber network requires, at a minimum, an SFT and electrical power. The SFT can be used alone as a repeater, without the need for an additional communications controllers or processors. Typically, however, a node will include some processor which desires to transport data on the single fiber network. The processor could be, for example, a microcontroller which is acquiring data from a sensor. The sensor could be, for example, a position sensor for a jet engine throttle. A processor in a different node on the single fiber network could be used to control an actuator, for example, a fuel valve for a jet engine. Another processor in yet another node on the single fiber network could be used for data storage, such as network maintenance information and error statistics. Typically then the processor will be some sort of local sensor, actuator, data storage, or computation device, which needs to communicate to other processors on the single fiber network.

Figure 2:
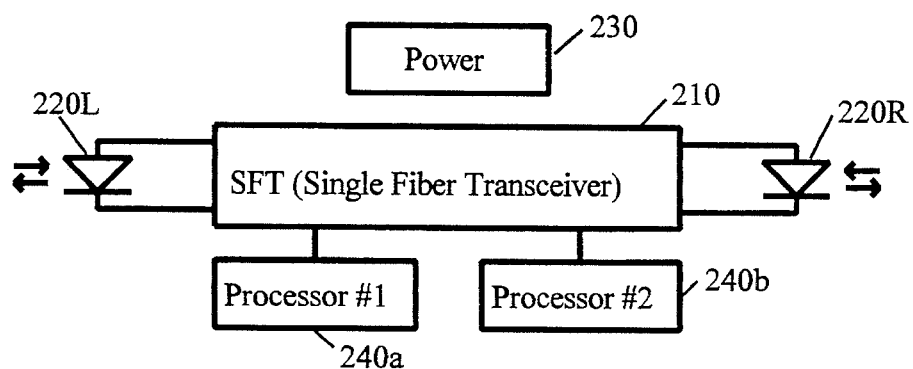
FIG. 2 is a block diagram of a single fiber node.

An example single fiber node, as shown in FIG. 2, is comprised of SFT 210, two half-duplex fiber optic emitters and detectors 220L and 220R, a power supply 230, and processors 240a and 240b. A processor connected to the SFT 210 must include a means by which to communicate serial digital data. This serial data is ideally encoded in such a way as to have known pulse widths relative to the bit rate in order to take full advantage of the features described herein. For example, Manchester encoded serial data is suitable for use with the SFT 210. Note that it is not a requirement that the processor be able to support bidirectional communications. For example, it would acceptable for a processor that is connected to a sensor to only transmit sensor readings, and would be acceptable for a processor that is connected to an actuator to only receive actuator position information. So even though each SFT 210 will support bidirectional communications, an SFT 210 can be connected to processors that transmit only, receive only, or both transmit and receive.

The SFT 210 design allows for connection to a plurality of processors. This may be desirable when processors in close physical proximity need to connect to the single fiber network. This capability reduces system cost since an SFT 210 can be shared by more than one processor. The current embodiment of the SFT 210 will support zero, one, or two processors.

The SFT 210 is comprised of electronic circuitry which requires electrical power to operate. The current embodiment requires 5 VDC power for operation, but different embodiments may require different or plural power sources.

Figure 3:
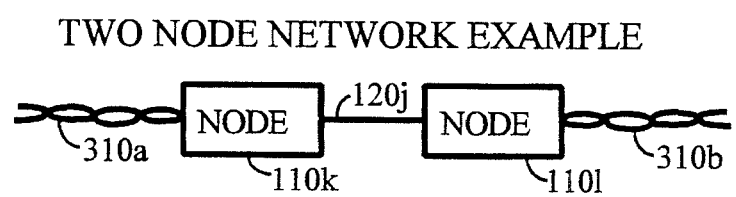
FIG. 3 is a block diagram of a two node single fiber network.

A special case network can consist of only two nodes and a single fiber segment. In this case it is possible to implement nodes with only a single fiber optic emitter/detector, since in this case there is no requirement to repeat the signal to another single fiber node. For example, the SFT 210 can be used in routers, which convert single fiber network packets to another media, such as twisted pair copper wire. FIG. 3 shows 310a and 310b which are two twisted pair copper networks, which are linked by a two noble single fiber network. 110k and 110l are nodes which convert single fiber packets to/from twisted pair copper wire packets, and communicate those packets over fiber optic cable 120j. A typical example of this special case would be two buildings which use twisted pair copper wire networks internally. A single fiber network would then be run between the buildings to connect to the twisted pair copper wire networks. The complete system would have the advantage of inexpensive twisted pair copper wire transceivers within each building, with noise and lightning immune fiber optic cable joining the building networks together.

A typical single fiber node will include a processor, with the means to transmit and receive serial digital data as described above. Many different types of processors and serial communications controllers can be used with the single fiber transceiver, and a description of processor architecture is beyond the scope of this disclosure. The current embodiment of the SFT 210 can be used with Motorola/Toshiba Neuron 3150 Chips, which are microcontrollers with built in serial communications controllers. The current embodiment of the SFT 210 uses ABB Halo 1A212 half-duplex fiber optic diodes as fiber optic emitters and detectors. These diodes operate as LED emitters when forward biased, and PIN receivers when reverse biased. Other similar diodes from other manufacturers can be used as well.

CURRENT SINGLE FIBER TRANSCEIVER PHYSICAL EMBODIMENT

Figure 4:
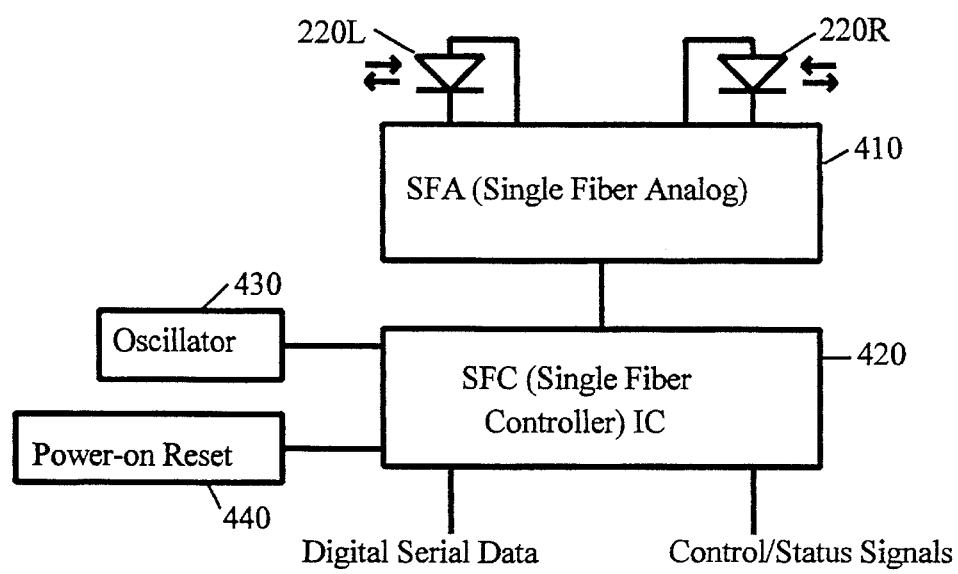
FIG. 4 is a physical block diagram of a single fiber transceiver according to the preferred embodiment of the invention.

With reference to FIG. 4, the current physical embodiment of the SFT 210 uses two main integrated circuits. 410 is called the SFA (Single Fiber Analog) device, which incorporates the analog circuitry needed to interface to the fiber optic emitters and detectors. The SFA is an application specific integrated circuit manufactured by G.E.C. Plessey Semiconductors. 420 is called the SFC (Single Fiber Controller) which incorporates the digital logic needed for the SFT 210. The SFC is a field programmable gate array manufactured by Xilinx Inc. Oscillator 430 is used to provide a fixed frequency clock source for the SFT 210. The current embodiment of the SFT 210 uses a 40 MHz oscillator, but this frequency can be changed to suit different systems and data rates. A power-on reset generator circuit 440 is used to ensure that all logic is in a known state when power is first applied to the SFT 210.

This physical embodiment is only one way in which the functionality of the single fiber transceiver can be implemented. For example, it is possible that all functionality could be included on a single mixed-signal integrated circuit, or it is possible that the SFA and/or SFC could be split up into several components. Techniques for implementing logic and circuitry based on functional requirements, such as the functional requirements of the SFT 210, are well known and beyond the scope of this disclosure. The technical description of the SFT 210 herein is therefore functional, with reference to the SFA and SFC devices only where needed to describe the current embodiment.

SINGLE FIBER TRANSCEIVER FUNCTIONAL OVERVIEW

Figure 5:
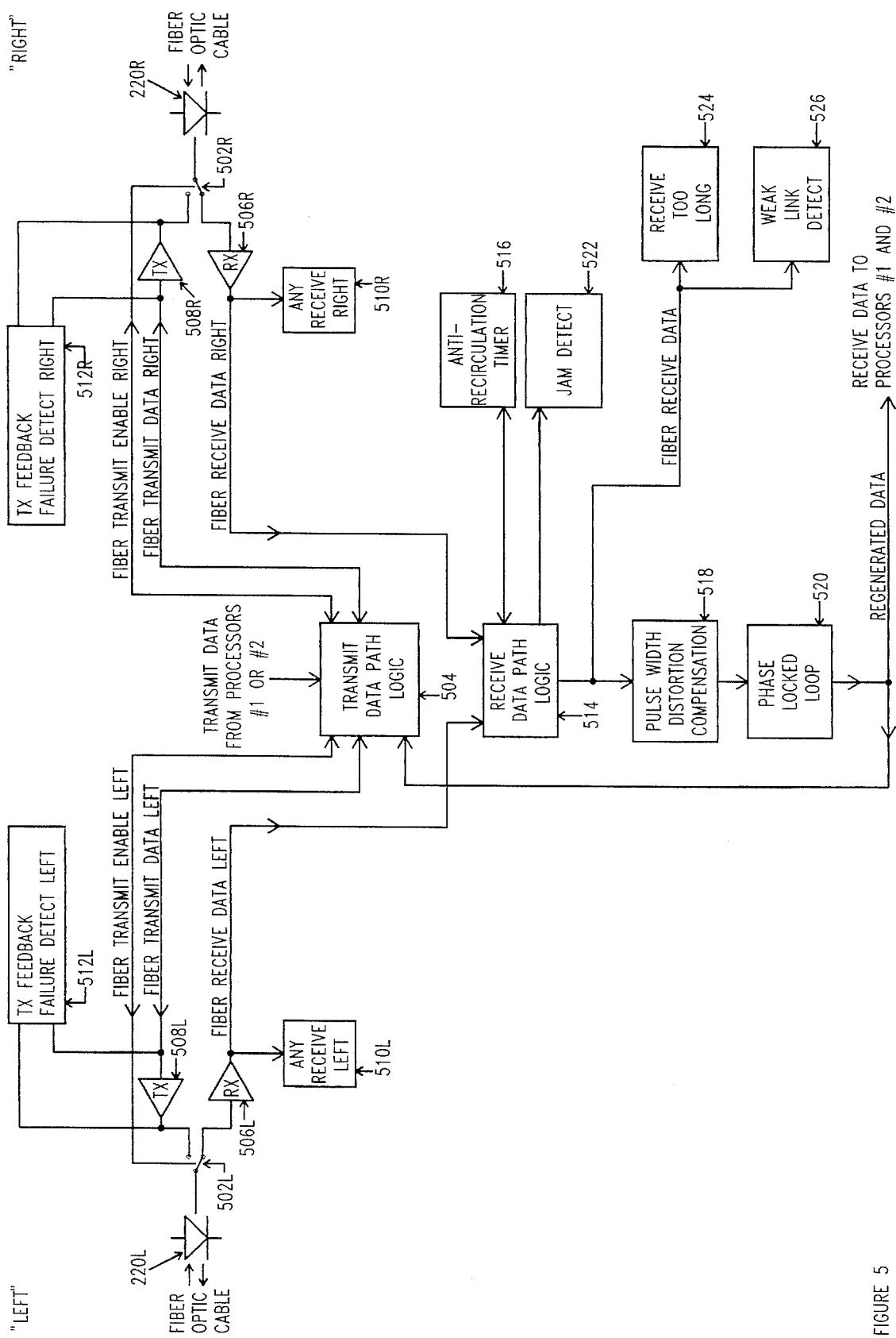
FIG. 5 is a functional block diagram of the transceiver of FIG. 4.

FIG. 5 is a top level functional block diagram of the SFT 210. As a matter of convention the fiber optic diodes, and associated circuits, are referred to as "left" and "right". This allows us to describe the direction of data flow through the SFT 210. The "left" and "right" designations are labels only; there is no physical requirement that the diodes be placed in any particular position.

Referring to FIG. 5, fiber optic diodes 220L and 220R connect to transmit/receive switching circuits 502L and 502R. These switching circuits are controlled by the transmit data path logic 504. The SFT 210 fiber optic diodes can assume the following states:

1. Both 220L and 220R set to receive. This is the normal quiescent state of an SFT 210 that is listening to both fiber segments, waiting for any message to start.

2. 220L set to transmit and 220R set to receive. This case is when data is been received from the right and repeated to the left.

3. 220L set to receive and 220R set to transmit. This case is when data is being received from the left and repeated to the right.

4. Both 220L and 220R set to transmit. This happens when the local node processor is supplying transmit data which is to be transmitted on the network. In this case the data is transmitted in both directions.

Again referring to FIG. 5, 506L and 506R comprise the analog receive circuitry for the left and right fiber optic detectors 220L and 220R. 508L and 508R are the transmit LED current drivers for the left and right fiber optic emitters 220L and 220R.

"Any Receive" latches 510L and 510R are provided to detect the presence of any receive data. These can be used by node processors to deduce the location of a fiber break in a loop topology network.

Transmit data path logic 504 is provided which controls transmission of data onto the single fiber network. This logic controls the transmit enable switches 502L and 502R for both sides. Data is gated to the transmit current sources 508L and 508R from either regenerated received data or from the node processor transmit data.

LED feedback failure detect circuits 512L and 512R compare the fiber transmit data logical level to a feedback signal from the transmit current sources 508L and 508R. The feedback failure detect circuits will flag a fault if there is no LED current flow when the fiber transmit data signal is asserted, or if there is LED current flow when the fiber transmit data signal is negated.

The receive data path logic 514 determines when it is acceptable to begin receiving data from one of the fiber optic receivers. This logic is assisted by the anti-recirculation timer 516. The quiescent state of the SFT 210 is to have both fiber optic receivers enabled in order to detect a new fiber network packet. When a new message is detected on one of the receivers, (for example 506L) then the receive data path logic will immediately disable the fiber receive data path from the other receiver. The transmit data path logic then enables the opposite side transmitter (for example 508R). Fiber receive data from the message is then regenerated through a pulse width distortion circuit 518 and a phase locked loop 520. This regenerated data is then passed to the transmit data path logic 504, and on to the opposite side transmitter (for example 508R). This is the message repeat path.

The regenerated receive data is also made available to the local node processor, which will receive all network messages. The opposite side receiver will remain disabled until the anti-recirculation timer 516 reaches its terminal count. The anti-recirculation timer is reset when any fiber message is being received, or when any message is being transmitted onto the fiber network. The anti-recirculation timer begins to run after the end of the received or transmitted message. This provides a fixed period of time following each network message (either received or transmitted) where any signal on the fiber receivers will be ignored. The data communications protocol must be configured to wait at least this long before sending new messages. If a processor originates a new message while the SFT 210 anti-recirculation timers are still running then this new message will be prevented from being transmitted on the single fiber network.

The anti-recirculation timer is required to prevent packets from continually recirculating around a loop topology network. Under normal conditions a packet will not recirculate around a single fiber network. As described earlier (FIG. 1(b)), an originating node transmits out both sides of the node, and this message is repeated around both sides of the loop until it collides on the opposite side of the network. Under these typical conditions the originating node will never receive its own message, since it is transmitting both ways. However, in the event that one transmitter on the originating node has failed, then the message will be transmitted from one side of the originating node only. This massage will then be repeated all the way around the loop until it reaches the opposite receiver of the originating node. The anti-recirculation timer will prevent the originating node from interpreting this message as a new message to be received and repeated, which would result in the originating node retransmitting (recirculating) the same message again. In order for the anti-recirculation timer mechanism to work correctly, the anti-recirculation timer period must be greater than the total propagation delay of messages travelling around the entire loop. The propagation delay around the loop is the total of the propagation delay through each node, and the total propagation delay of the light through fiber optic cables. The velocity of propagation of light through fiber optic cable is approximately 5 ns per meter. In the current embodiment of the SFT 210 the propagation delay through each node is approximately 500 ns.

Again referring to FIG. 5, jam detect logic 522 is provided to detect network jamming. A network jam is defined as a packet that is excessively long or unending. Network jams can result from faulty hardware, or from Covert injection of a jamming signal onto the network. If the single fiber transceiver is used with communications protocols where the packets are of some known maximum length, then this jam detection circuit can be enabled. The jam detect circuit includes a timer which has a period that is longer than the maximum expected network packet length. If the receive data path logic indicates that it is processing a receive packet for a period of time greater than this maximum packet length, then the jam detect circuit will disable the corresponding receiver. This isolates the jam to the fiber segment where it originated, and prevents the jam from being further propagated on the single fiber network.

The receive too long circuit 524 is provided to check for fiber receive data signals that are stuck in an asserted state. This may result from a hardware failure of the receiver circuitry or the fiber optic diode, or from covert injection of an optical power source onto the network. Since data is being transported with pulse widths of known duration, it is possible to provide a timer which detects the data signal being stuck in an asserted state for a period that is longer than the expected maximum pulse width. The receive too long circuit includes such a timer, and will disable the corresponding receiver if the fiber receive data signal is asserted for longer than this timer period.

Weak link detection circuitry 526 is provided to detect low optical power from the fiber optic receivers. The purpose of this circuit is to provide a warning of marginal optical power, before data errors are experienced on the weak segment. It is a well known characteristic of fiber optic receivers that the pulse width of the receive data can be distorted; this is referred to as pulse width distortion. It is common for the magnitude of the pulse width distortion to be proportional to the receive optical power level. The SFT 210 receiver 506L and 506R has been specifically designed to include this characteristic. Since the serial data being transported on the network has known pulse widths, the actual pulse width can be compared to the expected pulse width to determine the magnitude of the pulse width distortion, which is proportional to the receive optical power level. The weak link detection circuitry will set a warning latch when the magnitude of this difference indicates that the receive optical power is becoming marginally low. The threshold level can be set external to the SFT 210.

Although pulse width distortion can be advantageous to determine the receive power level, this distortion can corrupt receive data if this distortion is not corrected, and would accumulate as the signal is repeated around the network. The pulse width distortion compensation circuit 518 is used to restore the receive data pulse widths to those expected. Since serial data is being transported with known pulse widths, it is possible to remove the pulse width distortion from the received data to provide regenerated data that has the same pulse widths as those transmitted. Pulse width distortion affects pulse widths, or the time between opposite edges of received data. In addition to this type of distortion, jitter is present in the fiber receive data as well. Jitter is distortion that affects signal frequency, or the period between like edges of received data. A phase locked loop 520 is used to remove jitter from the pulse width corrected fiber receive data, and to maintain phase lock with the received data. The regenerated data is pulse width distortion and jitter free.

DETAILED FUNCTIONAL DESCRIPTION OF THE SFT 210

Fiber Optic Receiver and Transmitter

Figure 6:
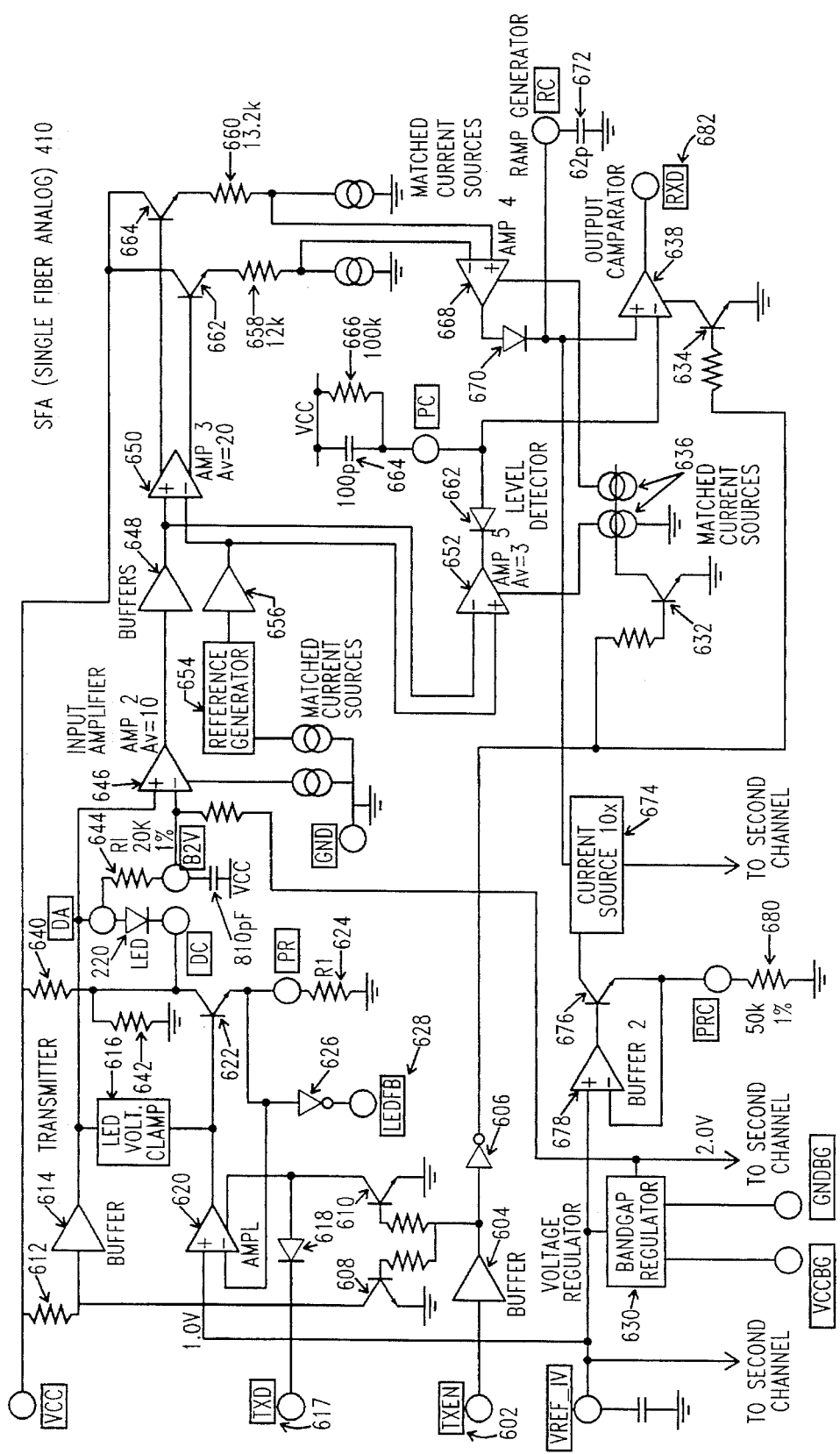
FIG. 6 is a block diagram of a fiber optic receiver employed in the transceiver of FIG. 4.

Referring to FIG. 6, the fiber optic transmitter and receiver circuits 508, 506 are implemented in a G.E.C. Plessey ASIC 410 (Application Specific Integrated Circuit), part number MMH3919. This figure has been prepared so that an individual skilled in the art of analog ASIC design will be able to implement the same functionality as described herein.

The signal 602 TXEN is used to control the direction of data flow, via buffer 604 and inverter 606. When 602 TXEN is low, the circuit 410 is in transmit mode. When 602 is high the circuit 410 is in receive mode.

When signal 602 TXEN is asserted (low), the output of buffer 604 will also be low, which will turn off clamping transistors 608 and 610. Pullup resistor 612 will then enable buffer 614 which includes a high current NPN (100 mA) transistor, not shown, at its output. This buffer 614 sources current to the anode: of fiber optic diode 220. A voltage clamp circuit 616 ensures that the forward voltage across the fiber optic diode 220 is within specified limits.

When the input signal 617 TXD is negated (low) the diode 618 clamps buffer 620 which disables the base drive to high current (100 mA) transistor 622. This disables the current sink for fiber optic diode 220 so that the diode 220 current will be off. The voltage across external resistor 624 will then drop to zero. This resistor 624 is connected to the input of inverter 626, so the output of the inverter 626, which is signal 628 LEDFB will be high. This is the transmit feedback signal.

When the input signal 617 is asserted (high) the diode 618 no longer conducts, and since clamp transistor 610 is turned off, the buffer 620 is allowed to operate, and will drive transistor 622 such that the emitter voltage will equal the reference voltage of buffer amplifier 620. The reference input to buffer amplifier 620 is set to 1.0 V using a bandgap regulator circuit 630. The fiber optic diode current will flow through transistor 622, with the emitter of transistor 622 held at one volt. The resistor 624 then is used to program the current for fiber optic diode 220, since the voltage across resistor 624 is held at a constant 1.0 V. In the current embodiment the external resistor is set to 14.0 ohms, to program a fiber optic diode 220 forward current of 70 mA. Since the voltage across resistor 624 is now 1 V, the output of inverter 626, which is signal LEDFB will now be low. Thus the LEDFB signal is a direct indication of the magnitude of current flow through resistor 624, which is in the same current path as fiber optic diode 220.

Note that when the signal 602 TXEN is asserted (low), the output of inverter 606 will be high, which will turn on clamp transistors 632 and 634. These transistors 632, 634 disable the receiver output amplifier current sources 636, and disable the receive output comparator 638. This prevents the receiver circuit from responding to the transmit data signal while the fiber optic diode 220 is transmitting.

When signal 602 TXEN is negated (high), the output of buffer 604 will be high, which will turn on clamp transistors 608 and 610. Transistor 608 disables buffer 614, so that this buffer 614 will no longer source current to fiber optic dime 220. Transistor 610 disables buffer amplifier 620, so that transistor 622 will no longer sink current from fiber optic diode 220.

With the signal 602 TXEN negated, the resistor divider comprised of resistors 640 and 642 then sets the cathode reverse bias voltage for fiber optic diode 220. The anode of fiber optic diode 220 then is biased approximately 1.7 V lower than the cathode using resistor 644 which is connected to the bandgap regulator 630.

Transimpedance amplifier 646 then converts the current signal from the fiber optic diode 220 to a corresponding output voltage, with the amplifier gain set to 10. Buffer 648 provides the output of the amplifier 646 to amplifiers 650 and 652.

Reference generator 654 supplies an output reference that mirrors the reference level of amplifier 646. The output of this reference generator 654 is buffered by buffer 656, the output of which is provided to amplifiers 650 and 652.

Differential amplifier 650 amplifies the signal received from the fiber optic diode 220, through amplifier 646 and buffer 648. The difference in the resistors 658 and 660 on the emitters of transistors 662 and 664 respectively set a threshold level which allows for the worst case fiber optic diode 220 reverse leakage (dark current level). The current embodiment of the SFT uses ABB Halo 1A212 fiber optic diodes, which have a worst case reverse leakage of 100 nA.

Amplifier 652, diode 662, external capacitor 664, and external resistor 666 comprise a negative peak detector, which develops a voltage stored on capacitor 664 relative to the amplitude of the receive signal. The peak detector voltage is provided to the negative input of comparator 638.

A linear ramp generator is comprised of amplifier 668, diode 670, external capacitor 672, and the current source comprised of current multiplier 674, current source transistor 676, buffer amplifier 678, and external current programming resistor 680. The capacitor 672 will charge very rapidly when amplifier 668 goes high and sources current through diode 670. When the output of amplifier 668 drops, the discharge rate of capacitor 672 will be linear as the current is sourced by constant current source 674. The current is programmed via external resistor 680, which has a constant voltage of 1.0 V across it, as provided by transistor 676, buffer amplifier 678, and bandgap reference 630. Thus the rise time of the signal on capacitor 672 will be quite fast, but the fall time will be a slower linear ramp under the control of the current source 674. The voltage on capacitor 672 is applied to the positive input of comparator 638. The waveform then on capacitor 672 will have various degrees of pulse width distortion, depending on the threshold point at which the pulse width is measured.

The output comparator 638 then is used to provide an output signal 682 RXD based on the waveform on capacitor 672, with the threshold point on the waveform being selected by the negative peak detector level stored on capacitor 664. Thus for low input power levels the negative peak will be relatively close to the top of the waveform on capacitor 672, so there will be minimal pulse width distortion since the threshold point is not very far down the ramp. However, for high input power levels the negative peak detector level will be relatively close to the bottom of the waveform on capacitor 672, so there will be significant pulse width distortion since the threshold point is most of the way down the ramp. Thus the magnitude of pulse width distortion is unidirectional, and is directly proportional in received signal amplitude.

Repeater and Receive Data Path

Figure 7:
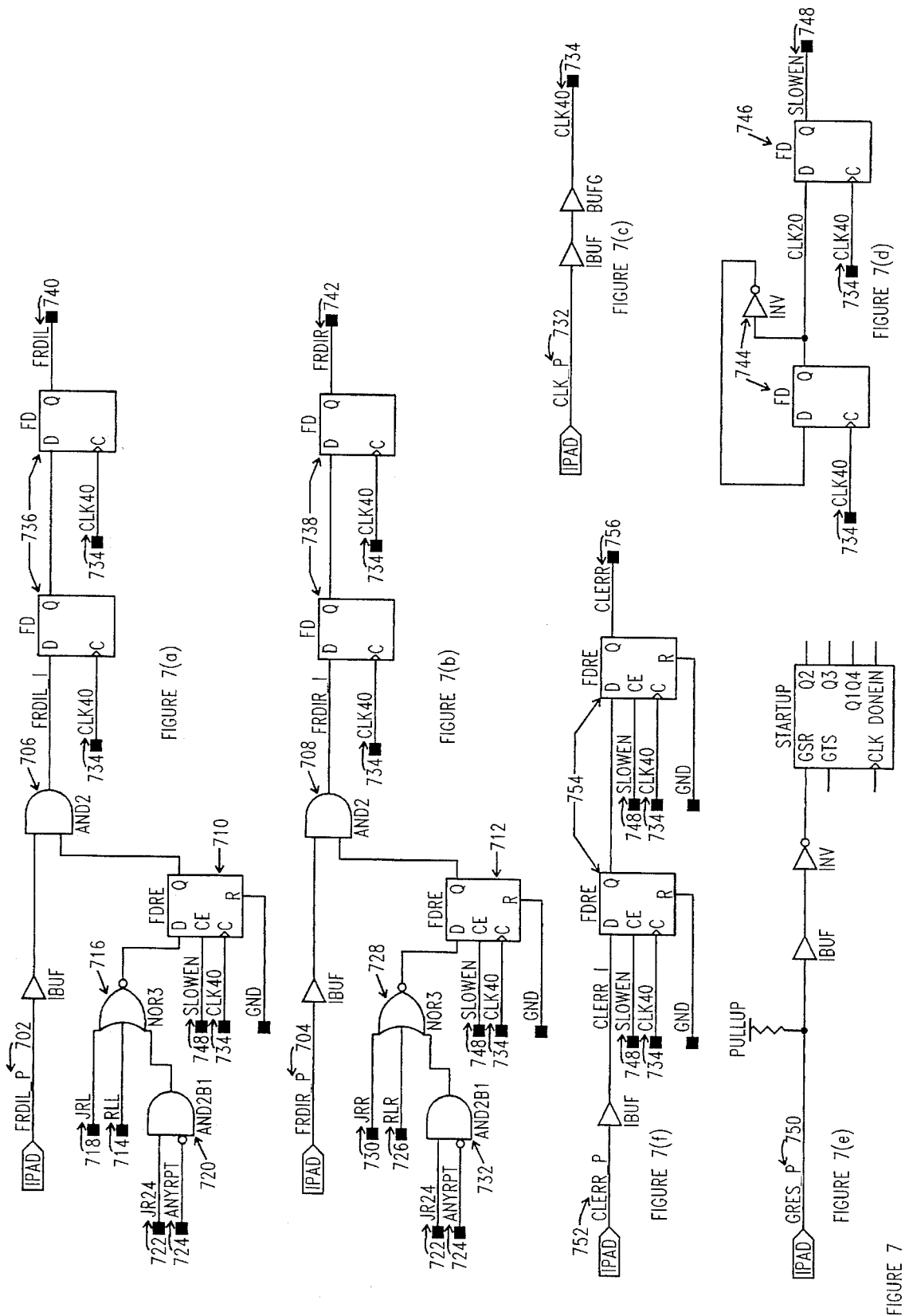
FIG. 7 is a logic diagram of receive data, qualifiers, synchronizers, reset and system clock circuits of the transceiver of FIG. 4.

Referring to FIG. 7, the received digital data input signals 702 FRDIL$_{13}$ P and 704 FRDIR_P are first qualified by AND gates 706 and 708 respectively. The qualifying inputs are from pipeline registers 710 and 712 which will disable the respective receive data path in the event of a receive too long or jam conditions, which are described later.

In the case of the left side receiver 506L, the signal 714 RLL is asserted when a receive too long condition exists, and this will force the output of NOR gate 716 low, the output of which will be pipelined through register 710 to disable AND gate 706. The signal 718 JRL is asserted when a jam condition exists, and this will force the output of NOR gate 716 low, which will then disable the receive path as described for signal 714 RLL. If an SFT 210 repeater is not enabled, but a jamming receive signal is present, then AND gate 720 will disable this jamming receive signal. In this case signal 722 JR24 will assert (the jam detect timer has detected a jam) while the signal 724 ANYRPT is negated (the SFT 210 is not repeating in either direction). This causes the output of AND gate 720 to assert, and therefore the output of NOR gate 716 will go low, which will then disable the receive path as described for signal 714 RLL.

In the case of the right side receiver, the signal 726 RLR is asserted when a receive too long condition exists, and this will force the output of NOR gate 728 low, the output of which will be pipelined through register 712 to disable AND gate 708. The signal 730 JRR is asserted when a jam condition exists, and this will force the output of NOR gate 728 low, which will then disable the receive path as described for signal 726 RLR. If an SFT 210 repeater is not enabled, but a jamming receive signal is present, then AND gate 732 will disable this jamming receive signal. In this case signal 722 JR24 will assert (the jam detect timer has detected a jam) while the signal 724 ANYRPT is negated (the SFT 210 is not repeating in either direction). This causes the output of AND gate 732 to assert, and therefore the output of NOR gate 728 will go low, which will then disable the receive path as described for signal 726 RLR.

The outputs of AND gates 706 and 708 are asynchronous to the system clock signal 732 CLK_P. 732 CLK_P is buffered to create signal 734 CLK40, which clocks all flip-flops in the SFT 210. Input signals asynchronous to the clock signal 732 CLK_P are synchronized using dual stage registers, in order to reduce the probability of metastability. The receive data signals from the outputs of AND gates 706 and 708 are synchronized using 736 and 738 dual stage synchronizing registers respectively. The signals 740 FRDIL and 742 FRDIR respectively are the qualified and synchronized fiber receive data signals which are used by other SFT 210 logic.

In the current embodiment the system clock is a 40 MHz oscillator. The nominal period of this clock is 25 ns. The Clock signal 734 CLK40 is divided by two using D flip-flop 744 in a standard synchronous divide by two configuration. The resulting 20 MHz clock is pipelined using register 746 to generate signal 748 SLOWEN. This signal is used to enable certain sections of the logic every other 734 CLK40 cycle, effectively slowing this logic to 20 MHz. In this fashion all flip-flops, registers, and counters which have their CE or CLK_EN signals connected to 748 SLOWEN are operating at 20 MHz. This eases the placement and routing of the logic in the field programmable gate array. Future embodiments of the SFT 210 in faster logic devices may not need to have some of the logic slowed down in this manner. In that case the 744, 746, and 748 components would not be required.

An external active-low power-on reset generator is connected to 750 GRES_P. All flip-flops, registers and counters are cleared to 0 when 720 is asserted.

Signal 752 CLERR_P is synchronized using dual stage synchronizing registers 754 to provide a synchronous error clear signal 756 CLERR. This signal is used asserted by external logic or an external processor to clear error latches in the SFT 210.

Figure 8:
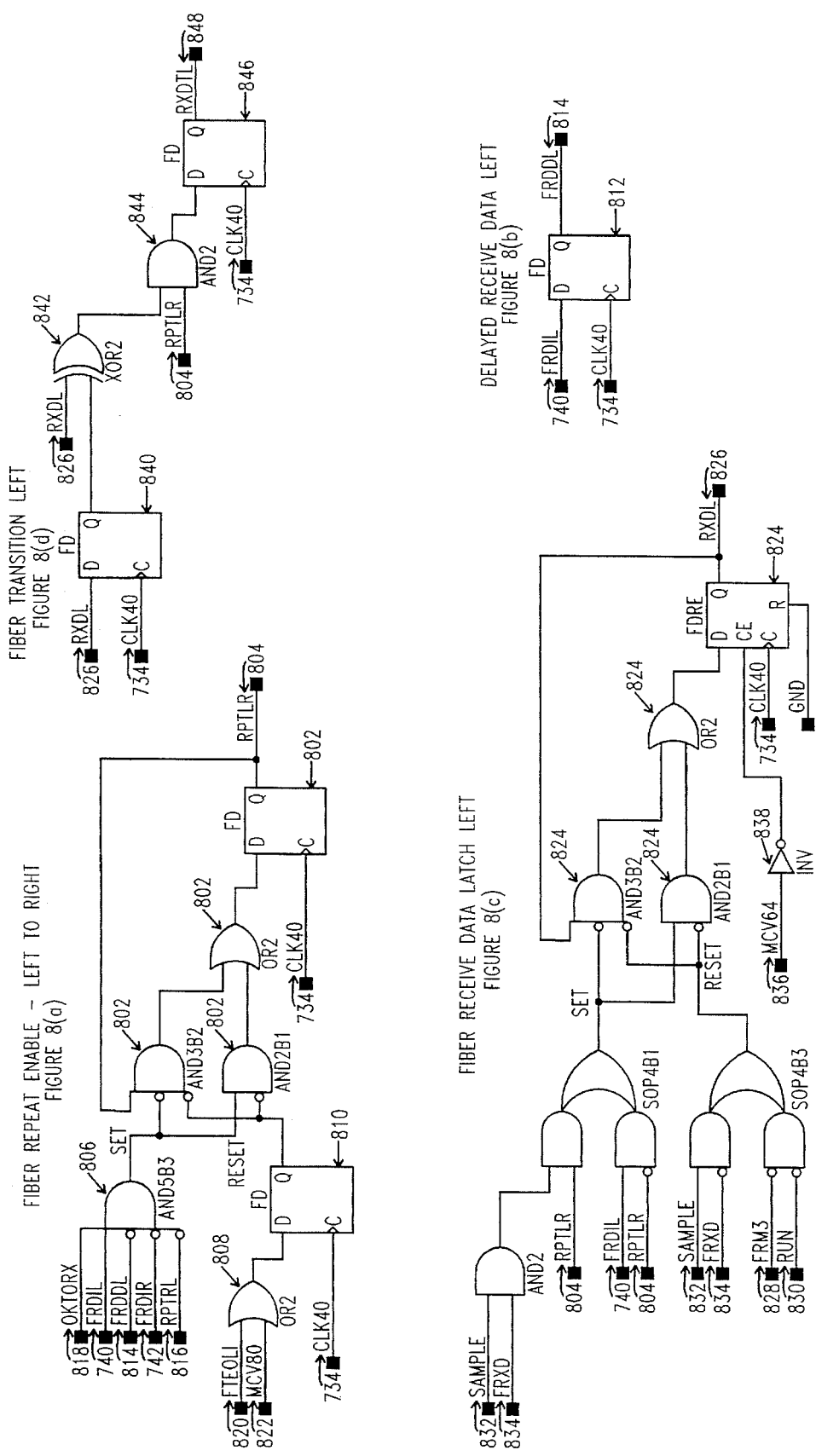
FIG. 8 is a logic diagram of left to right repeat enable, left regenerated receive data, and left receive data transition detector circuits of the transceiver of FIG. 4.

FIG. 8 describers the receive data path logic for data received from the left fiber optic receiver. Set-reset flip-flop 802 provides the signal 804 RPTLR which indicates that the SFT 210 is repeating from left to right AND gate 806 qualifies the setting of flip-flop 802. OR gate 808 qualifies the resetting of flip-flop 802, via pipeline register 810. D flip-flop 812 provides a copy of signal 740 FRDIL which is delayed by one clock cycle. The resulting signal 814 FRDDL is used in conjunction with 740 FRDIL at AND gate 806 to detect the rising (asserting) edge of the receive data signal 740 FRDIL. In the event that the opposite side repeater is enabled, signal 816 RPTRL will be asserted, and this will disable AND gate 806. In the event that the opposite side receive data signal 742 FRDIR signal asserts simultaneously with 740 FRDIL then this will disable and gate 806 to prevent both direction repeat enable flip-flops from asserting simultaneously; this gives right-to-left priority over left-to-right. If either direction repeat enable is asserted, if either local processor is transmitting, or if the anti-recirculation timer is running, then the signal 818 OKTORX will negate, disabling AND gate 806. Assuming that the SFT 210 is in an otherwise quiescent state, the rising edge of signal 740 FRDIL, as detected by AND gate 806, will cause set-reset flip-flop 802 to set, which asserts the left-to-right enable signal 804 RPTLR. The repeat enable set-reset flip-flop 802 will be reset via OR gate 808 and register 810 if the left side is transmitting (signal 820 FFEOLI is asserted), or if the end of the received data has been reached (signal 822 MCV80 asserts). Signal 820 forces set-reset flip-flop 802 to be held in reset while the left channel is transmitting, to prevent any possible feedback on the left receive signal from affecting SFT 210 operation.

Set-reset flip-flop 824 is used to provide regenerated receive data from the left side receiver. The regenerated receive data is signal 826 RXDL. Before the left-to-right repeater is enabled (signal 804 RPTLR is negated), the set-reset flip-flop 824 will set as soon as the fiber receive data signal 740 FRDIL asserts. This causes the signal 826 RXDL to assert as soon as possible after receive data is first detected, in order to minimize propagation delay of the starting bit of the packet. This ensures that the starting bit of the packet will be properly propagated around the network, even though the pulse Width distortion compensation circuits and phase locked loops in the SFT 210s have not yet synchronized to the receive data. Similarly, the first time that the set-reset flip-flop 824 must negate will be concurrent with the starting (initial phase lock) of the phase locked loop. The same falling edge of signal 828 FRM3 that starts the phase locked loop will also cause set-reset flip-flop 824 to reset, since the phase locked loop is not yet running (signal 830 RUN is negated). Once the repeater is enabled (signal 804 RPTLR is asserted), and once the phase locked loop is running, (signal 830 RUN is asserted), then the setting and resetting of set-reset flip-flop 824 is controlled by the phase locked loop. The signal 832 SAMPLE is provided by the phase locked loop for this purpose. The signal 834 FRXD is the pulse width distortion corrected receive data signal provided by the pulse width distortion compensation circuit. This data signal is sampled according to the 832 SAMPLE signal from the phase locked loop, and set-reset flip-flop 824 will then set if both 834 FRXD and 832 SAMPLE are high, or reset if 834 FRXD is low and 832 SAMPLE is high. Thus the set-reset flip-flop 824 samples receive data that is already pulse width distortion corrected, under control of the phase locked loop, to provide regenerated left side receive data signal 826 RXDL. The clock enable for set-reset flip-flop 824 is inverted signal 836 MCV64, which is provided by the manchester code violation detection circuit 837. When the end of packet manchester code violation is detected by the manchester code violation detection circuit 837, the signal 836 MCV64 will assert. This will be inverted by inverter 838, which will then negate the clock enable signal. This ensures that the set-reset flip-flop 824 will not change state at the end of packet until after the repeater is disabled.

A transition detector for the regenerated left side receive data signal is constructed from D flip-flop 840, XOR gate 842, AND gate 844, and D flip-flop 846. This transition detector is configured to assert signal 848 RXDTL for one clock cycle each time signal 826 RXDL changes state, but only while the left-to-right repeater is enabled (signal 804 RPTLR is asserted). The signal 848 RXDTL is used by the manchester code violation detection circuit to detect the end of the data in the received message.

Figure 9:
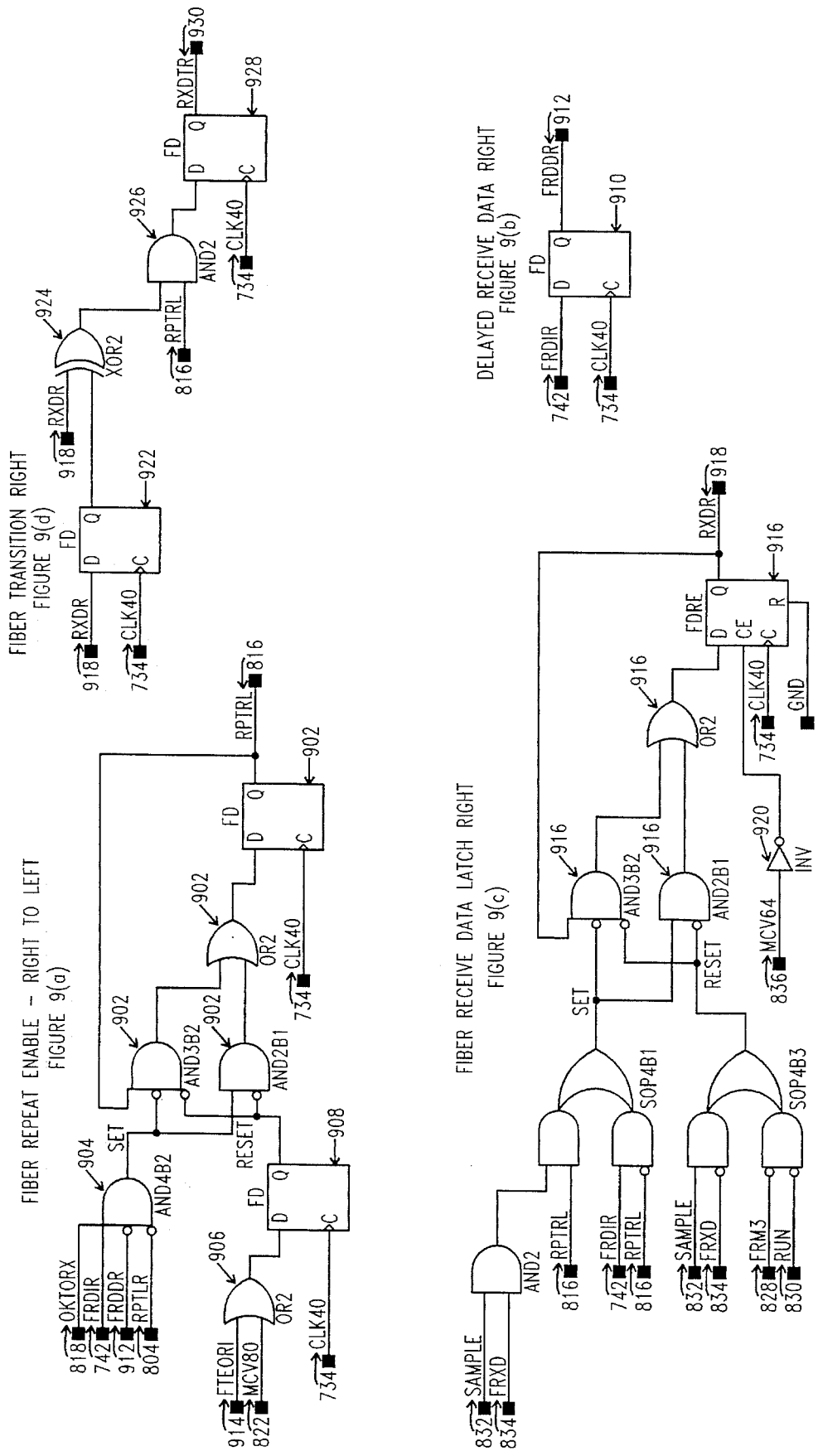
FIG. 9 is a logic diagram of right to left repeat enable, right regenerated receive data, and right receive data transition circuits of the transceiver of FIG. 4.

FIG. 9 describes the receive data path logic for data received from the right fiber optic receiver. Set-reset flip-flop 902 provides the signal 816 RPTRL which indicates that the SFF 210 is repeating from right to left. AND gate 904 qualifies the setting of flip-flop 902. OR gate 906 qualifies the resetting of flip-flop 902, via pipeline register 908. D flip-flop 910 provides a copy of signal 742 FRDIR which is delayed by one clock cycle. The resulting signal 912 FRDDR is used in conjunction with 742 FRDIR at AND gate 904 to detect the rising (asserting) edge of the receive data signal 742 FRDIR. In the event that the opposite side repeater is enabled, signal 804 RPTLR will be asserted, and this will disable AND gate 904. If either direction repeat enable is asserted, if either local processor is transmitting, or if the anti-recirculation timer is running, then the signal 818 OKTORX will negate, disabling AND gate 904. Assuming that the SFT 210 is in an otherwise quiescent state, the rising edge of signal 742 FRDIR, as detected by AND gate 904, will cause set-reset flip-flop 902 to set, which asserts the right-to-left enable signal 816 RPTRL. The repeat enable set-reset flip-flop 902 will be reset via OR gate 906 and register 908 if the right side is transmitting (signal 914 FTEORI is asserted), or if the end of the received data has been reached (signal 822 MCV80 asserts). Signal 914 forces set-reset flip-flop 902 to be held in reset while the right channel is transmitting, to prevent any possible feedback on the right receive signal from affecting SFT 210 operation.

Set-reset flip-flop 916 is used to provide regenerated receive data from the right side receiver. The regenerated receive data is signal 918 RXDR. Before the right-to-left repeater is enabled (signal 816 RPTRL is negated), the set-reset flip-flop 916 will set as soon as the fiber receive data signal 742 FRDIR asserts. This causes the signal 918 RXDR to assert as soon as possible after receive data is first detected, in order to minimize propagation delay of the starting bit of the packet. This ensures that the starting bit of the packet will be properly propagated around the network, even though the pulse width distortion compensation circuits and phase locked loops in the SFT 210s have not yet synchronized to the receive data. Similarly, the first time that the set-reset flip-flop 916 must negate will be concurrent with the starting (initial phase lock) of the phase locked loop. The same falling edge of signal 828 FRM3 that starts the phase locked loop will also cause set-reset flip-flop 916 to reset, since the phase locked loop is not yet running (signal 830 RUN is negated). Once the repeater is enabled (signal 816 RPTRL is asserted), and once the phase locked loop is running, (signal 830 RUN is asserted), then the setting and resetting of set-reset flip-flop 916 is controlled by the phase locked loop. The signal 832 SAMPLE is provided by the phase locked loop for this purpose. The signal 834 FRXD is the pulse width distortion corrected receive data signal provided by the pulse width distortion compensation circuit. This data signal is sampled according to the 832 SAMPLE signal from the phase locked loop, and set-reset flip-flop 916 will then set if both 834 FRXD and 832 SAMPLE are high, or reset if 834 FRXD is low and 832 SAMPLE is high. Thus the set-reset flip-flop 916 samples receive data that is already pulse width distortion corrected, under control of the phase locked loop, to provide regenerated right side receive data signal 918 RXDR. The clock enable for set-reset flip-flop 916 is inverted signal 836 MCV64, which is provided by the manchester code violation detection circuit 837. When the end of packet manchester code violation is detected by the manchester code violation detection circuit 837, the signal 836 MCV64 will assert. This will be inverted by inverter 920, which will then negate the clock enable signal. This ensures that the set-reset flip-flop 916 will not change state at the end of packet until after the repeater is disabled.

A transition detector for the regenerated right side receive data signal is constructed from D flip-flop 922, XOR gate 924, AND gate 926, and D flip-flop 928. This transition detector is configured to assert signal 930 RXDTR for one clock cycle each time signal 918 RXDR changes state, but only while the right-to-left repeater is enabled (signal 816 RPTRL is asserted). The signal 930 RXDTR is used by the manchester code violation detection circuit 837 to detect the end of the data in the received message.

Figure 10:
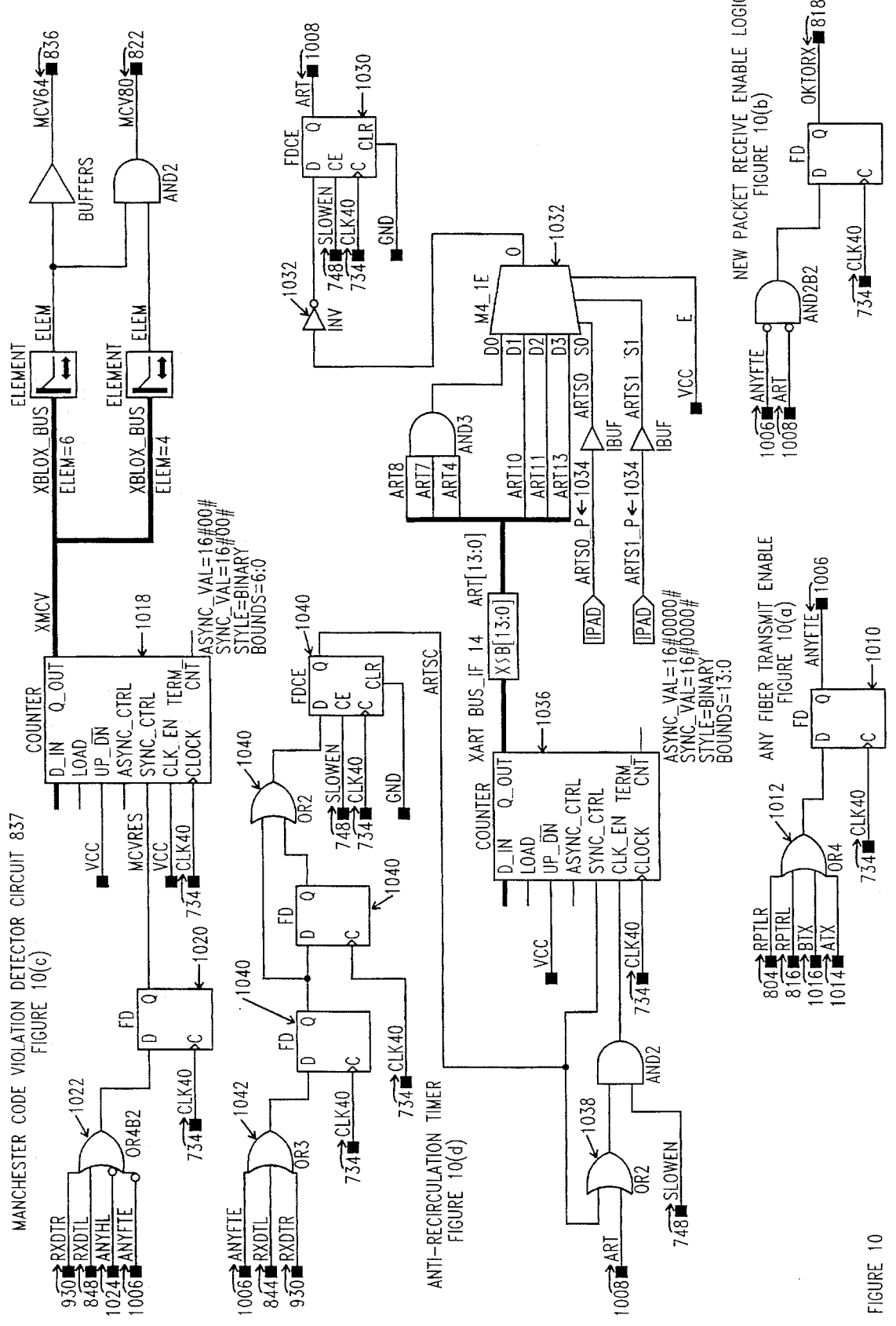
FIG. 10 is a logic diagram of a Manchester code violation detector and anti-recirculation timer circuits of the transceiver of FIG. 4.

Referring to FIG. 10, the signal 818 OKTORX is provided as an output from pipeline register 1002. The D input of register 1002 is provided by AND gate 1004. The signal 818 OKTORX then is a copy of the output of AND gate 1004, delayed by one clock cycle. The signal 818 OKTORX is as one of the qualifying signals that must be asserted before either direction repeater will enable. For signal 818 OKTORX to assert, both inputs to AND gate 1004 must be negated. Thus if signal 1006 ANYFTE is negated (the SFT 210 is not transmitting on either side), and signal 1008 ART is negated (the anti-recirculation timer is not running), then OKTORX will be asserted.

The signal 1006 ANYFTE is provided as an output from pipeline register 1010. The D input of register 1010 is provided by OR gate 1012. The signal 1006 ANYFTE then a is copy of the output of OR gate 1010, delayed by one clock cycle. The signal 1006 ANYFFE is used to qualify the signal 818 OKTORX, and is used to restart the anti-recirculation timer 516. Signal 1006 ANYFTE will assert if signal 804 RPTLR is asserted (the SFT 210 is repeating from left to right), if the signal RPTRL is asserted (the SFT 210 is repeating from right to left), if the signal 1014 ATX is asserted (240a processor #1 is transmitting), or if the signal 1016 BTX is asserted (240b processor #2 is transmitting).

Manchester Code Violation Detection

The current embodiment of the SFT 210 is intended to be used with a 40 MHz oscillator 430, and 1.25MHz Manchester encoded serial data as provided by 240a processor #1 and 240b processor #2, in a plurality of nodes. For Manchester encoded serial data the nominal data bit period then is 800 ns, with a transition in the middle of that period (400 ns) if the bit is a "0" bit. The 40 MHz oscillator allows the 800 ns bit period to be sampled every 25 ns, or 32 times per bit period. All timing relating to manchester code violation detection 837, pulse width distortion compensation 518, and the phase locked loop 520 are based on these frequencies and periods for this embodiment of the SFT 210. Those skilled in the an will realize that the SFT 210 logic can easily be modified to suit different oscillator and serial data frequencies, simply by changing terminal count values and the like.

The current embodiment of the SFT 210 is designed to be used with Manchester encoded serial data. This type of encoding provides for one or two signal transitions per bit period, for "1" and "0" bits respectively. Thus there is at least one transition per bit period while data is being communicated. When data ceases the transitions cease. The data signal may remain high or low at this time, but there will be no more transitions. This is known as a manchester code violation, since a transition does not occur in the next bit period. Since signal jitter and distortion can result in the received transitions occurring at inexact times, a manchester code violation is declared when no transition in receive data has occurred for two bit periods since the last detected transition. This manchester code violation is used to detect the end of the received data, as is commonly referred to as the "end of packet manchester code violation". The SFT 210 will transmit manchester code violations that are no less than two and one-half bit periods long to ensure that these are properly detected by the adjacent node(s).

In the current embodiment of the SFT 210, the start bit of each message is not corrected for pulse width distortion, and is not phase locked. This results in this bit stretching in width as it is repeated by nodes along a single fiber network. This effect impacts the operation of the manchester code violation detection circuit 837 and the receive too long detection circuit 524. In the case of the manchester code violation circuit 837 the receive data signal must be ignored until this first bit has ended. In the case of the receive too long detection circuit, the terminal count for the receive too long timer 524 must be set greater than the maximum anticipated bit stretch. Each node in the current embodiment of a single fiber network 3, 5 can stretch the start bit by as much as 300 ns, and this accumulates through each node in the network.

Again referring to FIG. 10, the manchester code violation detection circuit 837 is comprised of counter 1018, pipeline register 1020, and OR gate 1022. Counter 1018 is a free running 7 bit binary synchronous counter. Pipeline register 1020 provides a signal which will synchronously reset counter 1018. Thus OR gate 1022 will, after one clock cycle of delay, control the synchronous reset input to counter 1018. The purpose of counter 1018 is to measure the period of time since the last transition in received data. Counter 1018 will be held in reset (at count 0) if signal 1006 ANYFTE is negated, so that the counter 1018 will not run if the SFT 210 is not transmitting. Also, counter 1018 will be held in reset (at count 0) during the propagation of the start bit of each message, since signal 1024 ANYHL will be negated until the next bit in the message is detected. Once the SFT 210 is transmitting (signal 1006 ANYFTE is asserted) and the first bit of the message has been propagated (signal 1024 ANYHL is asserted), the counter 1018 will run. If the SFT 210 is repeating from left to right then the signal 848 RXDTL will assert for one clock cycle each time the left side receive data signal changes state, and this will reset the counter 1018. If the SFT 210 is repeating from right to left then the signal 930 RXDTR will assert for one clock cycle each time the right side receive data signal changes state, and this will reset the counter 1018. Thus, while the SFT 210 is receiving data from either side, the manchester code violation counter 1018 will reset each time a transition is detected in the received data. After a transition is detected (the counter 1018 has been reset) the counter 1018 counts up from zero. Since there are 32 clock cycles per bit period, the counter will reach a count of 64 if no transition is detected for two bit periods. At count=64 signal 836 MCV64, which is bit 6 of the counter 1018, asserts. This prevents receive data flip-flops 826 and 916 from changing state, so any further receive data transitions will now be ignored. At count=80 signal 822 MCV80, which is the AND of bits 4 and 6 of the counter 1018, asserts. This signal disables the repeaters, by causing flip-flops 802 and 902 to be reset. Thus the receive data is ignored after no transition has been detected for two bit periods, and the SFT 210 disables the repeaters (and therefore stops transmitting) after a further one-half bit period.

Anti-Recirculation Timer

Also referring to FIG. 10, the anti-recirculation timer 516 is comprised of pipeline register 1030, inverting multiplexer 1032, period selection signals 1034 ARTS0_P and ARTS1_P, 14 bit binary synchronous counter 1036, clock enable OR gate 1038, pipeline registers 1040, and OR gate 1042. The anti-recirculation timer 516 is configured to run at 20 MHz, using the previously described signal 748 SLOWEN to enable the logic every second clock cycle. Pipeline registers 1040 are used to detect 25 ns period events from 40 MHz logic, and provide a resulting 50 ns wide reset pulse for the slower anti-recirculation timer counter 1036. OR gate 1042 is used to control the anti-recirculation counter 1036 synchronous reset input, via the pipeline registers 1040. Thus the anti-recirculation counter 1036 will be reset if signal 1006 ANYFTE is asserted (the SFT 210 is transmitting on either side), if signal 848 RXDTL asserts (the SFT 210 is receiving from the left and a transition has been detected), or if signal 930 RXDTR asserts (the SFT 210 is receiving from the right and a transition has been detected). When counter 1036 is reset to 0, or is not at its terminal count, then the D input to pipeline register 1008 will be high. The signal 1008 ART will therefore be high as well, since it is a copy of the D input delayed by two clock cycles. The signal 1008 ART, while asserted, will cause the signal 818 OKTORX to be negated, which will prevent the setting of repeat enable flip-flops 802 and 902. Also, the signal 1008 ART, while asserted, will enable the clocking of counter 1036 via OR gate 1038. Thus the counter 1036 will count up while the signal ART 1008 is asserted. Signals 1034 ARTS0_P and ARTS1_P are used to select an input to inverting multiplexer 1032. This determines the terminal count for the anti-recirculation timer 516. The current embodiment of the SFT 210 provides for anti-recirculation time periods of 20 µs, 51.2 µs, 102.4 µs and 409.6 µs depending on which inverting multiplexer 1032 input is selected. Once the counter reaches the selected terminal count, the output of inverting multiplexer 1032 will go low, which will result in signal 1008 ART following low two clock cycles later. The counter 1036 will then cease counting since the clock enable will be negated via OR gate 1038. The signal 1008 ART will re, main negated, so signal 818 OKTORX will be asserted to enable reception of new data. This is the quiescent state of the anti-recirculation timer 516.

Receive Data Delay and Pulse Width Distortion Emphasis

Figure 11:
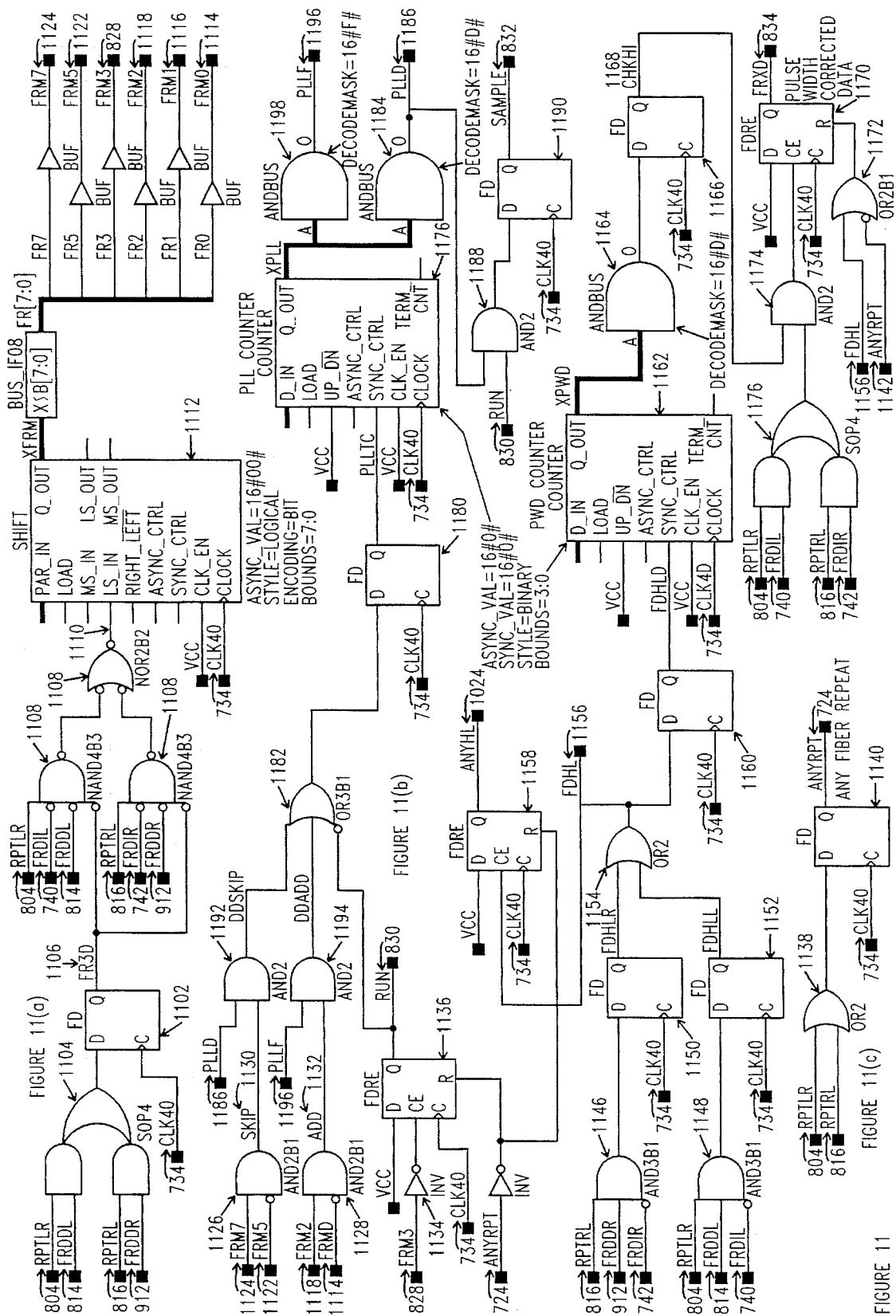
FIG. 11 is a logic diagram of receive duty delay, pulse width distortion emphasis, pulse width distortion compensation and phase lock loop circuits of the transceiver of FIG. 4.

Referring now to FIG. 11, the receive data from left or right is processed to emphasize the amount of pulse width distortion, and is clocked through a shift register to provide copies of the received data that are delayed by different periods of time. The delayed copies of the data are used by the pulse width distortion compensation circuit 518, the phase locked loop 520, and the weak link detection circuit 526.

Figure 12:
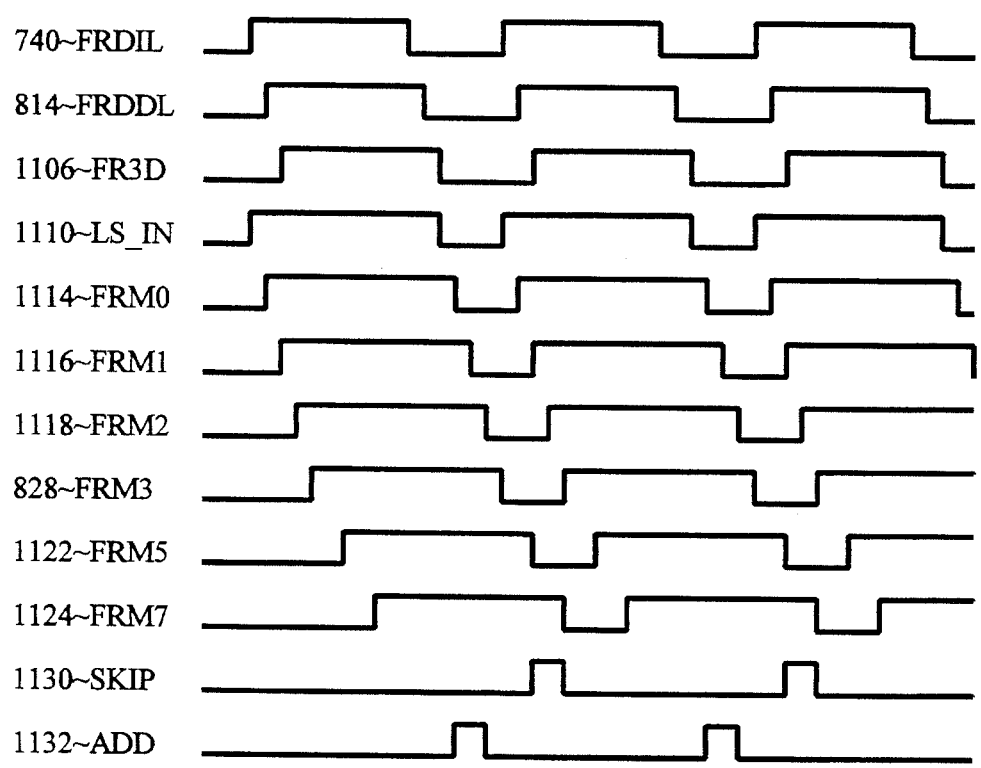
FIG. 12 is example receive data waveforms as received from the left side.

As described earlier, a copy of the left side receive data 740 FRDIL is delayed by one clock cycle and is provided as signal 814 FRDDL. Also as described earlier a copy of the right side receive data 742 FRDIR is delayed by one clock cycle and is provided as signal 912 FRDDR. Sum of products gate 1104 will gate either 814 FRDDL or 912 FRDDR into register 1102, depending on which repeater is enabled, as dictated by signal 804 RPTLR or 912 RPTRL. This results in receive data signal 1106 FR3D which is delayed by one more clock cycle. Thus, the receive data signal has a counterpart that is delayed by one clock cycle (814 FRDDL or 912 FRDDR), and another counterpart that is delayed by two clock cycles (1106 FR3D). FIG. 12 demonstrates example relative timing for data being received from the left. These example waveforms demonstrate typical pulse width distortion for a 50% duty cycle transmitted waveform.

Again referring to FIG. 11, the original receive data signals, one cycle delayed receive data signals, and two cycle delayed receive data signal are connected to sum of products gates 1108. The AND portions of the sum of products are designed to have a high output if any of the receive data signals are high, or a low output only if all of the receive data signals from one side are low, for example if 740 FRDIL, 814 FRDDL and 1106 FR3D are low. The resulting signal 1110 is connected to the left shift input (LS_IN) of shift register 1112. The sum of products gates 1108 have the effect of emphasizing the magnitude of the pulse width distortion on signal 1110 by 50 ns (two clock cycles), as shown in FIG. 12.

Again referring to FIG. 11, the shift register 1112 is an 8 bit serial in, parallel out, logical shift register. The outputs used from this shift register are 1114 FRM0 (bit 0), 11 16 FRM1 (bit 1), 1118 FRM2 (bit 2), 828 FRM3 (bit 3), 1122 FRM5 (bit 5), and 1124 FRM7 (bit 7). These outputs simply provide multiple copies of the pulse width distortion emphasized signal 1110, with various amounts of delay. The resulting waveforms for the example receive data signal are shown in FIG. 12. Again referring to FIG. 11, AND gates 1126 and 1128 are used to generate signals 1130 SKIP and 1132 ADD. These signals are used to detect early and late falling edges respectively as part of the phase locked loop phase detector. None of the signals described thus far have been corrected for pulse width distortion or jitter. These signals are simply delayed copies of the original received data.

Pulse Width Distortion Compensation

As described earlier, the first bit of the received message is repeated without any attempt to correct for pulse width distortion. Thus the pulse width distortion circuit 518 is not enabled until the first failing edge of received data. Delayed receive data signal 828 FRM3 is inverted by inverter 1134 to enable D flip-flop 1136. The D input of flip-flop 1136 is tied to VCC, so it will set as soon as it is enabled. The first falling edge of receive data will propagate through to signal 828 FRM3, so it will change state from high to low. This will cause the output of inverter 1134 to go from low to high, which will enable flip-flop 1136. The flip-flop 1136 then will set one clock cycle after 828 FRM3 goes low. The resulting signal 830 RUN is used to enable the pulse width distortion and phase locked loop circuits 518, 520. At the end of the received packet the repeater will disable (negating signal 804 RPTLR or 816 RPTRL), which will result in the output of OR gate 1138 going low. The output of pipeline register 1140, which is signal 724 ANYRPT, will go low one clock cycle later. This will cause the output of inverter 1144 to go high, which will in turn cause flip-flop 1136 to reset, negating signal 830 RUN.

AND gates 1146 and 1148 are provided to detect each falling edge of receive data from the left and right sides respectively. Pipeline registers 1150 and 1152 delay the outputs of AND gates 1146 and 1148 respectively by one clock cycle. OR gate 1154 then will assert its output, which is signal 1156 FDHL, for one clock cycle each time a high-to-low edge is detected from one of the receivers.

The first time signal 1156 FDHL asserts, D flip-flop 1158 will set, since its D input is connected to VCC. The output of flip-flop 1158, which is signal 1024 ANYHL, is used to enable the manchester code violation detection circuitry 837 and the processor receive output circuitry. Flip-flop 1158 will be reset by inverter 1144 after the end of packet, when the left or right repeater disables, as described earlier.

Pipeline register 1160 provides a copy of signal 1156 FDHL which is delayed by one clock cycle. This signal is 1161 FDHLD, which is used to reset the pulse width distortion compensation counter 1162. Counter 1162 is a 4 bit synchronous binary counter. This counter 1162 is reset every time a high-to-low transition is detected in the receive data. Decoder 1164 decodes the terminal count of counter 1162, and the terminal count indication is pipelined through register 1166 to generate signal 1168 CHKHI. The decode value of decoder 1164 is such that the signal 1168 CHKHI will assert one-half bit time (16 clock cycles) following the high-to-low edge of the received data. Since flip-flops 1150/1152, 1160, and 1166 each contribute a delay of one clock cycle in this path, the decoder is set to assert its output at count 13, so tidal signal 1168 CHKHI will properly assert 16 clock cycles following the high-to-low edge. D flip-flop 1170 generates the pulse width corrected data, which is provided on signal 834 FRXD. The D flip-flop 1170 D input is connected to VCC, so flip-flop 1170 will set the first time its clock enable input is asserted. OR gate 1172 will force flip-flop 1170 to be reset if signal 724 ANYRPT is negated (the SFF 210 is not repeating), or each time signal 1156 FDHL asserts (a high-to-low edge in the receive data is detected). The setting of flip-flop 1170 is controlled by AND gate 1174. Sum of products gate 1176 selects the fiber receive data signal to be corrected (either 740 FRDIL or 742 FRDIR), depending on which receiver is enabled (804 RPTLR or 816 RPTRL). This data will enable flip-flop 1170 via AND gate 1174 only if 1168 CHKHI is asserted. As was described earlier, 1168 CHKHI asserts for one clock cycle, every 16 clock cycles following the last detected high-to-low edge of receive data. Thus flip-flop 1170 is reset by every high-to-low edge of receive data. Also, flip-flop 1170 will only set in multiples of one-half bit period following this edge, when the receive data is high. This results in a pulse width distortion compensated signal 834 FRXD.

Figure 13:
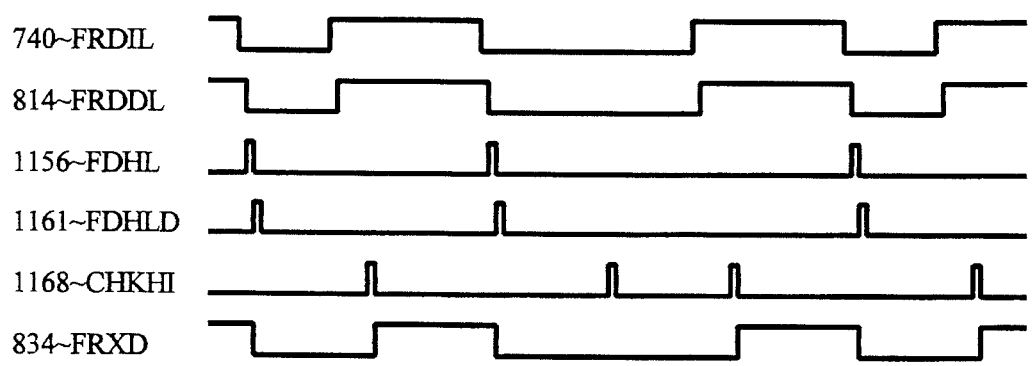
FIG. 13 is example pulse width distortion compensation waveforms for data as received from the left side.

Refer to FIG. 13 for example waveforms for the pulse width distortion compensation circuit 518. Note that one major advantage to this circuit 518 is that the output data is not delayed by one-quarter bit time, as is common in prior art. The SFT 210 embodiment reduces the propagation delay of the regenerated signal through the node, and can significantly reduce the overall network propagation delay if there is a large number of nodes in the network, or if the bit rate is relatively low as is common in distributed control networks. The SFT 210 pulse width distortion compensation circuit 518 is also better suited to tracking the typical pulse width distortion of fiber optic receivers, and especially the pulse width distortion of the SFA fiber optic receiver. Prior art in pulse width distortion compensation describes circuitry that will correct pulse width distortion that is ±50% of nominal. Fiber optic receivers suitable for use with the SET 210 exhibit no pulse width distortion in one direction, and possibly very severe (>80%) pulse width distortion in the other direction. Thus the pulse width distortion circuit described in prior art will not correct severe pulse width distortion from these receivers, which can be present at very high input optical power levels. The SFT 210 pulse width distortion compensation circuit 518 has been designed therefore to correct for pulse width distortion in one direction only, where the magnitude of the pulse width distortion is in the range of 0% to greater than 87%. in the SFT 210 embodiment the receive data signal, for example 740 FRDIL, only has to be low long enough to be captured by the high-to-low level edge detector flip-flop 1150. If this requirement is met then the flip-flop 1170 will regenerate the signal 834 FRXD with properly corrected pulse widths.

Phase Locked Loop

Referring again to FIG. 11, counter 1176 is the frequency generator for the phase locked loop 520. This component would normally be referred to as the VCO (Voltage Controlled Oscillator), but since this implementation is completely digital the typical phase locked loop analog circuits have been replaced accordingly. Thus 4 bit binary counter 1176, which is free running while the SFT 210 is repeating, generates an output clock that is exactly double the frequency of the received bit rate. The frequency of counter 1176 is adjusted to be higher by forcing it to skip count 15, and is adjusted lower by forcing it to repeat count 0. The synchronous reset signal 1178 PLLTC for counter 1176 is used to force the counter to skip count 15 or repeat count 0 under control of the phase detect logic.

Pipeline register 1180 is a one clock cycle delayed copy of the phase detector OR gate 1182. One input of OR gate 1182 will cause the counter 1176 to be held in reset while the signal 830 RUN is negated. This prevents the phase locked loop 520 from running while the SFT 210 is not repeating. Also, when signal 830 RUN asserts, as a result of the first falling edge of signal 828 FRM3 (delayed receive data), the counter 1176 will begin running and thus will be in initial phase lock with the receive data. The only capture transient is the first bit of each message which is repeated without correction, as described earlier. The phase locked loop 520 locks to the receive data signal on the first falling edge.

Decoder 1184 decodes count 13 of counter 1176, which will assert twice each bit period. The resulting decode signal 1186 PLLD is connected to AND gate 1188. The output of AND gate 1188 will assert if decode signal 1186 asserts while the signal 830 RUN is asserted (the phase locked loop is running). The output of AND gate 1188 is pipelined via register 1190 to generate signal 832 SAMPLE. The signal 832 SAMPLE controls when the flip-flops 824 and 916 sample the pulse width distortion corrected signal 834 FRXD. Thus the phase locked loop frequency generator counter 1176 controls the frequency and phase of the sampling of receive data in order to properly regenerate the data stream.

Phase error correction is accomplished using the signal 1178 PLLTC, which is derived from pipeline register 1180 and phase detector OR gate 1182. AND gates 1192 and 1194, and OR gate 1182, are provided to implement a type II (lead/lag) phase detector for speeding up and slowing down (phase adjusting) counter 1176. The counter 1176 provides two feedback signals for the phase detector; 1186 PLLD and 1196 PLLF.

Feedback signal 1186 PLLD is provided to phase detector AND gate 1192 by decoder 1184, which decodes count 13 of counter 1176. If a receive high-to-low edge occurs in the range of two or three clock cycles earlier than is expected by counter 1176, then the assertion of feedback signal 1186 PLLD will occur While signal 1130 SKIP is asserted. This will result in the outputs of phase detector AND gate 1192 asserting, and phase detector OR gate 1182 asserting. The output of pipeline register 1180 will then assert one clock cycle later, when the counter 1176 is at count 14. Pipeline register 1180 asserts signal 1178 PLLTC, so that at the next clock cycle the counter 1176 resets to count 0, skipping count 15. This shifts the phase of counter 1176 one cycle closer to the phase of the received data.

Feedback signal 1196 PLLF is provided to phase detector AND gate 1194 by decoder 1198, which decodes count 15 of counter 1176. If a receive high-to-low edge occurs in the range of two or three clock cycles later than is expected by counter 1176, then the assertion of feedback signal 1196 PLLF will occur while signal 1132 ADD is asserted. This will result in the outputs of phase detector AND gale 1194 asserting, and phase detector OR gate 1182 asserting. The output of pipeline register 1180 will then assert one clock cycle later, when counter 1176 has rolled over to count 0. Pipeline register 1180 asserts signal 1178 PLLTC, so that at the next clock cycle the counter 1176 resets to count 0, thus repeating count 0. This shifts the phase of counter 1176 one cycle closer to the phase of the received data.

Note that the magnitude of phase error must be at least two clock cycles before the phase locked loop 520 will introduce a single cycle of phase correction. This ensures that the loop gain is less than unity in order to prevent oscillation or amplification of signal jitter. Thus the SFT 210 phase locked loop 520 will not adjust the frequency generator phase unless the phase error is greater than ±6.25%, and will maintain phase lock with the receive data signal unless the phase error is greater than ±12.5%.

Weak Link Detection

The SFA fiber optic receiver 506 is designed such that the nominal pulse width of the received data is proportional to receive optical power. At minimum optical power input the magnitude of the pulse width distortion will be minimal, so the receive data waveform will closely match the waveform transmitted. As the receive optical power level increases, the magnitude of the pulse width distortion increases. At very high power levels the high level of the waveform stretches significantly, and the low level shrinks by a corresponding amount. Thus the greater the pulse width distortion, the greater the input optical power level. The weak link detection circuit 526 measures the magnitude of the pulse width distortion to determine the receive optical power level. As the magnitude of the of the distortion decreases, the low level of the waveform will approach the nominal transmit pulse width. The weak link detection circuit 520 in the current embodiment measures the amount of distortion in the low level of the pulse.

Figure 14:
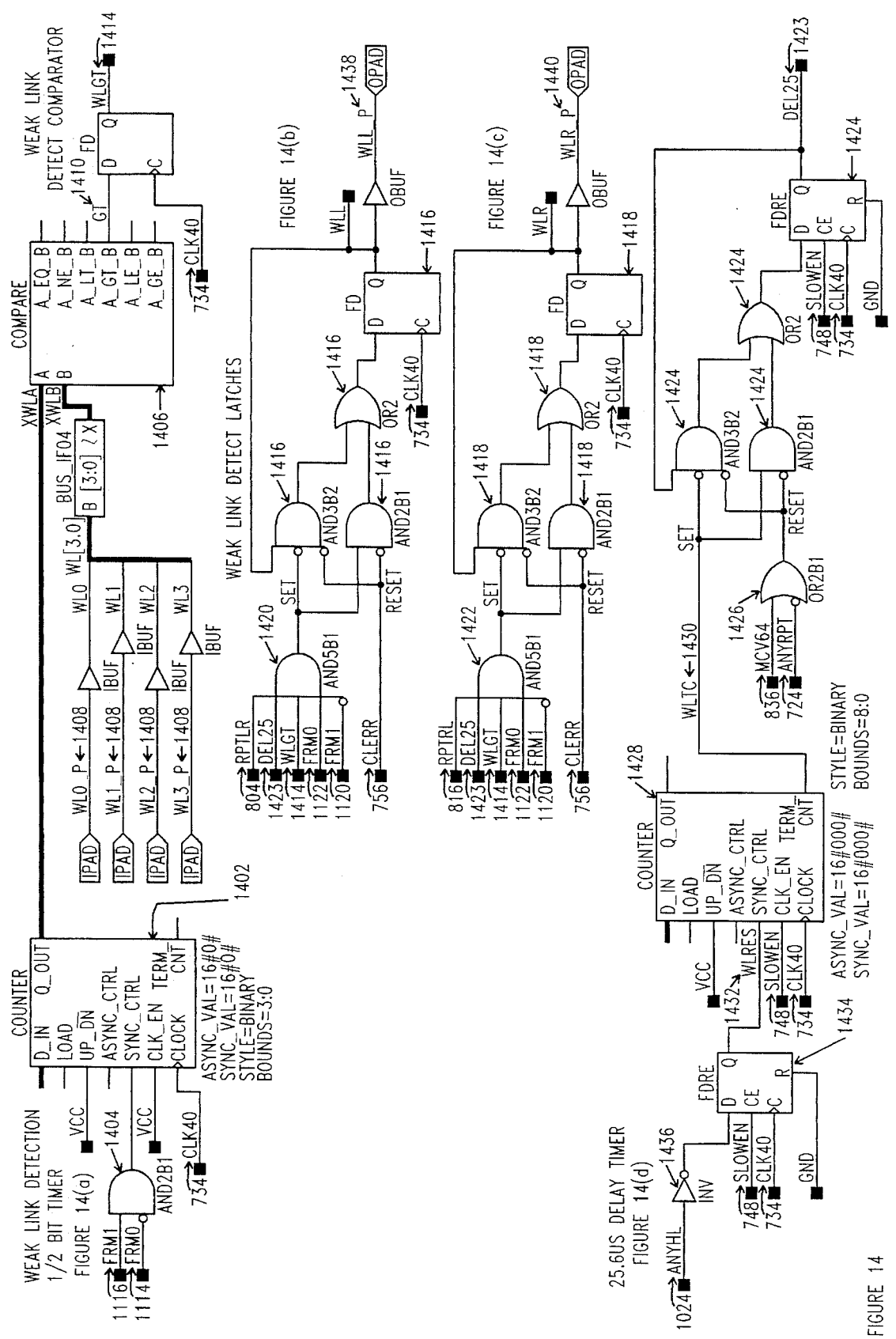
FIG. 14 is a logic diagram of a weak link detection circuit of the transceiver of FIG. 4.

Referring to FIG. 14, counter 1402 is used the duration of each low level pulse that is received, with a resolution of one clock cycle (25 ns). Counter 1402 is a 4 bit binary synchronous counter. AND gate 1404 is used to detect the failing edge of the received data, using receive data signal 1114 FRM0 and delayed receive data signal 1116 FRM1. The output of AND gate 1404 will assert the reset signal of counter 1402 on every occurrence of a falling edge of received data. Thus the counter 1402 will begin counting up from zero each time a falling edge of received data is detected.

4 bit magnitude comparator 1406 is used to compare the counter 1402 output count to a value which is set externally in input signals 1408 WL0_P through WL3_P. When the counter 1402 reaches a count which is greater then the value set on signals 1408, then the comparator 1406 will assert its "a greater than b" output which is signal 1410 GT. This signal is pipelined and therefore delayed by one clock cycle by, register 1412 to generate signal 1414 WLGT. Thus signal 1414 WLGT will assert when the counter 1402 output is two greater than the value set on pins 1408.

The weak link detection circuitry 526 described thus far operates on a receive data stream that can be from either the left or the right side. Set-reset flip-flops 1416 and 1418 are used to latch a weak link error condition, and do so based on which direction repeater is enabled, in order to identify which receiver is in a weak link condition. Signals 804 RPTLR and 816 RPTRL are used to determine which receiver is currently active.

AND gates 1420 and 1422 are used to control the setting of flip-flops 1416 and 1418 respectively. One of the inputs to AND gates 1420 and 1422 is signal 1423 DEL25. This signal is used to prevent the setting of the weak link detect flip flops at either the beginning or the end of the received data packets. Signal 1423 DEL25 is generated by set-reset flip-flop 1424. Flip-flop 1424 is reset by OR gate 1426 if signal 724 ANYRPT is negated (the SFT 210 is not repeating and is therefore not receiving), or if signal 836 MCV64 is asserted (an end of packet manchester code violation is detected). Flip-flop 1424 is set when counter 1428 reaches its terminal count, as represented by signal 1430 WLTC. Counter 1428 is a 9 bit synchronous binary counter, that has its clock enabled every second clock cycle by signal 748 SLOWEN. Counter 1428 is held in reset by signal 1432 WLRES, which is generated by pipeline register 1434. The D input of register 1434 is connected to inverter 1436, which is controlled by signal 1024 ANYHL. Thus the counter 1428 is held in reset until signal 1024 ANYHL asserts (the SFT 210 has begun to receive valid data). The timing of counter 1428 then is such that its terminal count signal 1430 WLTC will assert 25.6 μs after the SFT 210 begins to receive valid data, and this sets flip-flop 1424, which then asserts signal 1423 DEL25. Thus the 1423 DEL25 qualifier to AND gates 1420 and 1422 is asserted 25.6 μs after the start of valid receive data, and is negated when the manchester code violation is detected. This ensures that the weak link detection circuit 520 is only measuring pulses during periods where data is known to be valid, and after the fiber optic receiver 506 has had time to fully stabilize.

And gates 1420 and 1422 are used to detect the rising edge of the received data, using receive data signal 1114 FRM0 and delayed receive data signal 1116 FRM1. If at the time that this rising edge occurs the respective repeater is enabled (signal 804 RPTLR or 816 RPTRL respectively is asserted), valid data is being measured (signal 1423 DEL25 is asserted), and the pulse width is greater than the set threshold (signal 1414 WLGT is asserted), then flip-flop 1416 or 1418 respectively will set. Either signal 1438 WLL_P or signal 1440 WLR_P will then assert, indicating that a weak link has been detected. The flip-flops 1416 and 1418 are reset by the signal 756 CLERR, which can be controlled by a processor as described earlier.

The threshold selected for the weak link detection is normally determined empirically. This should be set so that in the target environment the weak link detection latches will set when the optical power level is a few dBm greater than the measured power level at which data errors begin to occur.

Any Receive Detection

Referring to FIG. 15, set-reset flip-flops 1502 and 1504 are used to detect the presence of any receive data from the left and right sides respectively. This status can be used by processors in the network to determine which receivers 506 are receiving data as expected. If certain receivers 506 are not receiving data as expected, which would be determined by the lack of any receive status from those receivers 506, then the processors #1, #2 could deduce the presence and location of a broken fiber optic cable in the single fiber network 3, 5.

Flip-flops 1502 and 1504 generate signals 1506 ARL_P and 1508 ARR_P, which are the any receive status bits that can be examined by a processor #1, #2. The flips-flops 1502 and 1504 are reset by signals 1510 CLARL_P and 1512 CLARR_P respectively, after passing through two-stage synchronizers 1514 and 1516 respectively. The signals 1510 CLARL_P and 1512 CLARR_P can be controlled by a processor #1, #2, in a similar fashion as the signal 756 CLERR which has been described previously.

Flip-flop 1502 is set via AND gate 1518 when signal 818 OKTORX is asserted (the SFT 210 is not currently transmitting or receiving), and signal 740 FRDIL asserts (the first data bit of a new packet is detected on the left side receiver 506L).

Flip-flop 1504 is set via AND gate 1520 when signal 818 OKTORX is asserted (the SFT 210 is not currently transmitting or receiving), and signal 742 FRDIR asserts (the first data bit of a new packet is detected on the left side receiver 506L).

Jam Detection

Figure 16:
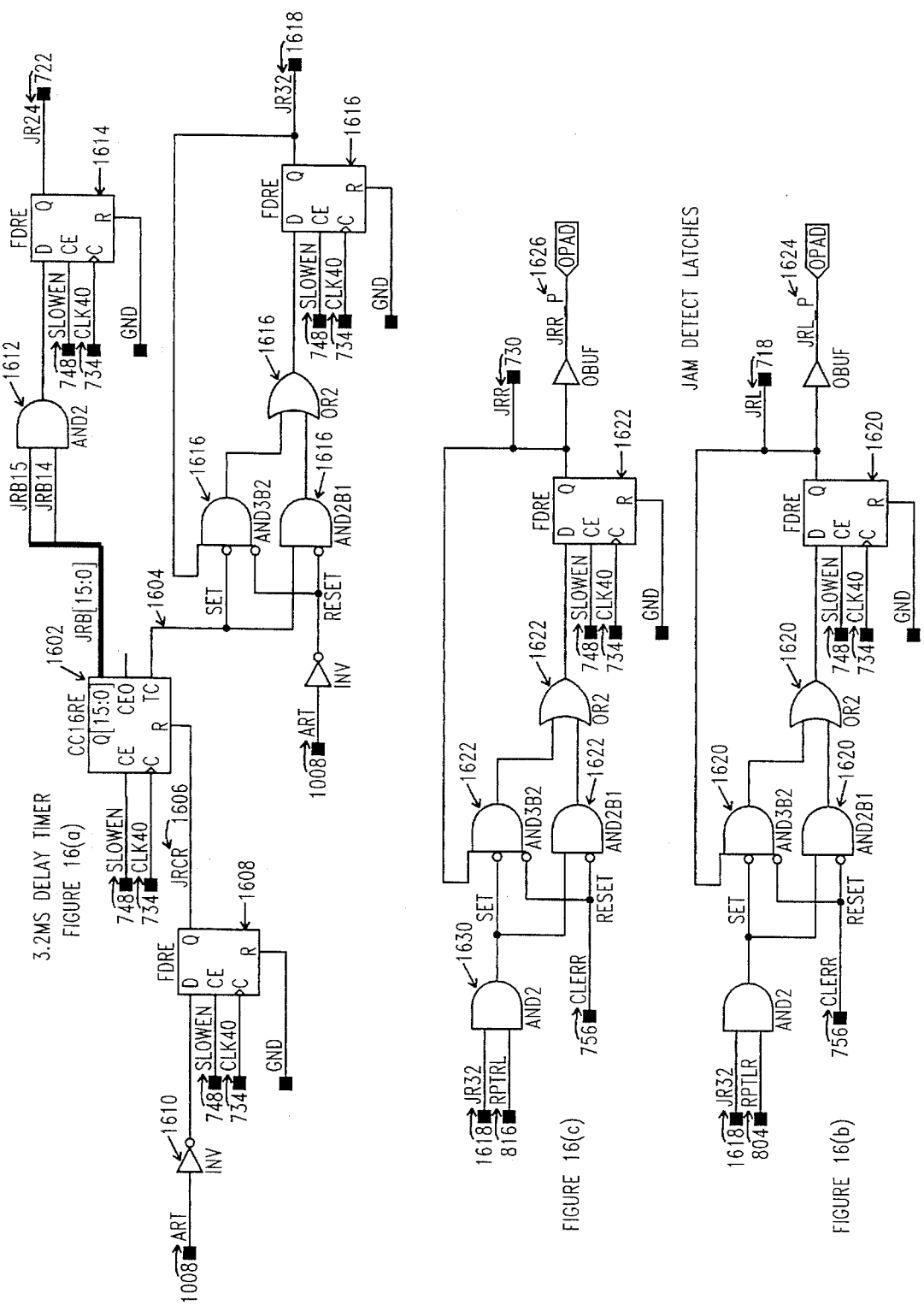
FIG. 16 is a logic diagram of a jam detection circuit of the transceiver of FIG. 4.

Referring to FIG. 16, the jam detector 522 is comprised mainly of counter 1602, which is a 16 bit binary synchronous counter. The jam detector counter 1602 is used to measure the length of time that the anti-recirculation timer 516 runs, since the anti-recirculation timer 516 will be running for the length of any packet being received, plus the duration of the anti-recirculation timer period. If the SFT 210 is used with data communication protocols that have maximum expected packet lengths, then the assumption can be made that a packet in excess of this length is illegal and can be considered to be a jamming signal. Thus the anti-recirculation timer period must be set to be greater than the maximum expected packet duration plus the anti-recirculation timer period. In this embodiment of the SFT 210, the 16 bit counter 1602 is enabled every second clock cycle by signal 748 SLOWEN, so that the terminal count (TC) output 1604 of counter 1602 will assert 3.2 ms after the counter starts to run.

Counter 1602 is held in reset by signal 1606 JRCR, which is provided by pipeline register 1608. The D input to register 1608 is provided by inverter 1610, the input of which is connected to signal 1008 ART. Thus the counter 1602 is held in reset while the anti-recirculation timer is not running (the SFT 210 is not transmitting). Once the SFT 210 begins receiving a packet the signal 1008 ART will assert, which will cause the signal 1606 JRCR to negate, via inverter 1610 and register 1608. At this point courtier 1604 will count up from zero.

The inputs of AND gate 1612 are connected to the two most significant bits of counter 1602. The output of AND gate 1612 then will set when the counter reaches 2.4 ms. This will cause signal 722 JR24 to assert, via pipeline register 1614. The signal 722 JR24 is used to disable the transmitter, so that the jamming signal will no longer be propagated around the network. If the transmitter was allowed to continue to transmit (repeat) the jamming signal until the jam detect latch sets, then jam detect latches in other nodes would then likely set as well. This would make it very difficult to identify the point on the network where the jamming signal originated. The signal 722 JR24 will cause the transmitter to stop repeating, so that the only point on the network where the jamming signal will be present for the full 3.2 ms will be the point where the jamming signal originates.

If the jamming signal is present for a full 3.2 ms, then counter 1602 will reach its terminal count and assert signal 1604. This will cause set-reset flip-flop to set, which will then assert signal 1618 JR32.

Flip-flops 1620 and 1622 generate signals 718 JRL and 730 JRR respectively. These are buffered to produce signals 1624 JRL_P and 1626 JRR_P, which are the jam detect status bits that can be examined by a processor #1, #2. The flip-flops 1620 and 1622 are reset by signal 756 CLERR which has been described previously.

Flip-flop 1620 is set via AND gate 1628 when signal 1618 JR32 is asserted (a packet is being received that has been at least 3.2 ms in duration), and signal 804 is asserted (the SFT 210 is repeating from left-to-right).

Flip-flop 1622 is set, via AND gate 1630 when signal 1618 JR32 is asserted (a packet is being received that has been at least 3.2 ms in duration), and signal 816 is asserted (the SFT 210 is repeating from right-to-left).

Flip-flop 1616 is reset by inverter 1632, which is controlled by signal 1008 ART. Thus when ART negates (the received packet has finished and the anti-recirculation timer 516 has expired), the flip-flop 1616 will reset, which will negate signal 1618 JR32.

Receive Too Long Detection

Figure 17:
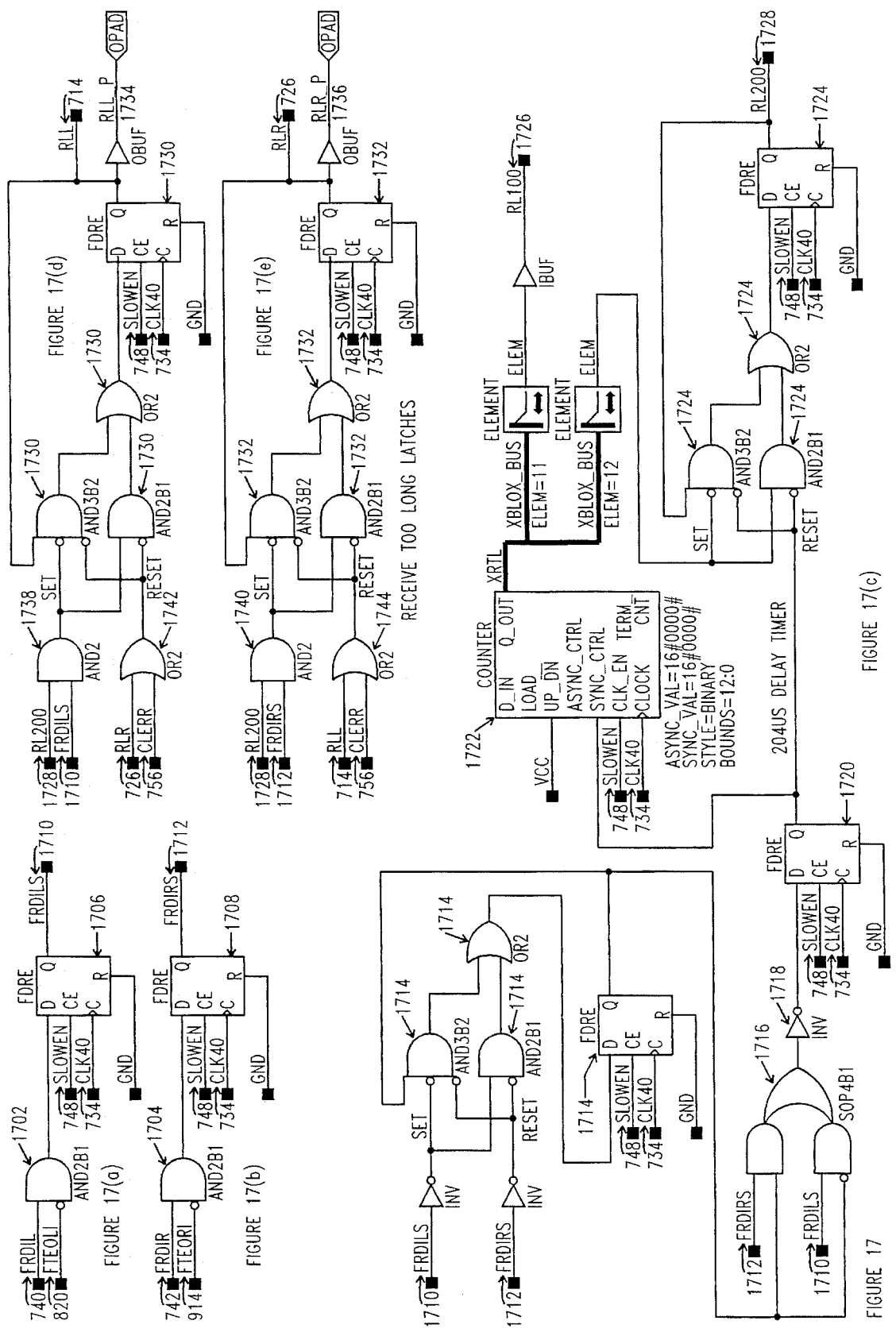
FIG. 17 is a logic diagram of a receive too long detection circuit of the transceiver of FIG. 4.

Referring to FIG. 17, the receive too long detection circuit 524 is used to detect a receive input that is stuck in an asserted state. This could happen as a result of a transmitter in an adjacent node being stuck on, as a result of a SFT 210 hardware fault, or as a result of the injection of a low frequency jamming signal. The worst-case normal on time for the receiver will be realized in single fiber networks that have a large number of nodes. In this case the first bit of each packet is stretched as it is repeated through each node, so this could for example stretch to approximately 30 μs in a 100 node network.

AND gates 1702 and 1704 are used to qualify the receive data signals 740 FRDIL and 742 FRDIR respectively. The signal 820 FTEOLI when asserted will disable AND gate 1702, so that the signal 740 FRDIL will he ignored while the SFT 210 is transmitting on the left side. The signal 914 FTEORI when asserted will disable AND gate 1704, so that the signal 742 FRDIR will be ignored while the SFT 210 is transmitting on the right side. The outputs of AND gates 1702 and 1704 are pipelined via registers 1706 and 1708 respectively to generate signals 1710 FRDILS and 1712 FRDIRS respectively.

Set-reset flip-flop 1714 is used to determine which receiver to monitor. Flip-flop 1714 will be set if the signal 1710 FRDILS (the left receive input) is negated, or reset if the signal 1712 FRDIRS (the right receive input) is negated. Thus the flip-flop 1714 cannot change state, and will be in a known state, when either 1710 FRDILS or 1712 FRDIRS asserts and remains asserted. The output of flip-flop 1714 then is used to select which receiver is to be monitored for a receive too long condition, via sum of products gate 1716. If signal 1710 FRDILS is negated and signal 1712 FRDIRS is asserted, then flip-flop 1714 will be set, so the output of sum of products gate 1716 will be a copy of signal 1712 FRDIRS. Similarly, if signal 1710 FRDILS is asserted and signal FRDIRS is negated, then flip-flop 1714 will be reset, so the output of sum of products gate 1716 will be a copy of signal 1710 FRDILS. Thus if either of the receive inputs is stuck in an asserted state, flip-flop 1714 will control sum of products gate 1716 such that the output of sum of products gate 1716 will be a copy of the receive signal that is stuck in the asserted state.

The output of sum of products gate 1716 is inverted by inverter 1718, and pipelined by register 1720. The output of register 1720 then will be low if the selected receive signal is asserted, or high if the selected receive signal is negated. If the selected receive signal is negated, then the output of register 1720 will be high, and this signal will cause counter 1722 and set-reset flip-flop 1724 to be reset. When the selected receive signal asserts, output of inverter 1718 will negate, and the output of register 1720 will subsequently go low. This will remove the reset from flip-flop 1724, and will negate the reset on counter 1722. Counter 1722 is a 13 bit synchronous binary counter that is enabled every second clock cycle by signal 748 SLOWEN.

Signal 1726 RL100 is the next to most significant bit of counter 1722. The timing of the counter 1722 is such that this bit will set when counter 1722 has run for 1.02.4 µs. The signal 1726 RL100 is used to disable the transmitter 508, so that the stuck receive signal will no longer be propagated around the network. If the transmitter 508 was allowed to continue to transmit (repeat) the stuck receive signal until the receive too long latch sets, then receive too long latches in other nodes would then likely set as well. This would make it very difficult to identify the point on the network where the stuck receive signal originated. The signal 1726 RL100 will cause the transmitter to stop repeating, so that the only point on the network where the stuck receive signal will be present for the full 204.8 µs will be the point where stuck receive signal originates.

When the most significant bit of counter 1722 sets, this causes flip-flop 1724 to set. This occurs when the counter 1722 has been running for 204.8µs. The flip-flop 1724 then sets the output signal 1728 RL200, which indicates that a receive too long condition has been detected.

Flip-flops 1730 and 1732 generate signals 714 RLL and 726 RLR respectively. These are buffered to produce signals 1734 RLL_P and 1736 RLR_P, which are the receive too long status bits that can be examined by a processor.

Flip-flop 1730 is set via AND gate 1738 when signal 1728 RL200 is asserted (a receiver has been stuck asserted for at least 204.8 µs), and signal 1710 FRDILS is asserted (the left receiver input is asserted). Flip-flop 1730 is reset by OR gate 1742. The output of OR gate 1742 will go high if signal 756 CLERR which has been described previously goes high, or if signal 726 RLR is asserted (a receive too long condition for the other receiver has already been latched).

Flip-flop 1732 is set via AND gate 1740 when signal 1728 RL200 is asserted (a receiver has been stuck asserted for at least 204.8 µs), and signal 1712 FRDIRS is asserted (the right receiver input is asserted). Flip-flop 1732 is reset by OR gate 1744. The output of OR gate 1744 will go high if signal 756 CLERR Which has been described previously goes high, or if signal 714 RLL is asserted (a receive too long condition for the other receiver has already been latched).

Transmit Data Path Logic

Figure 18:
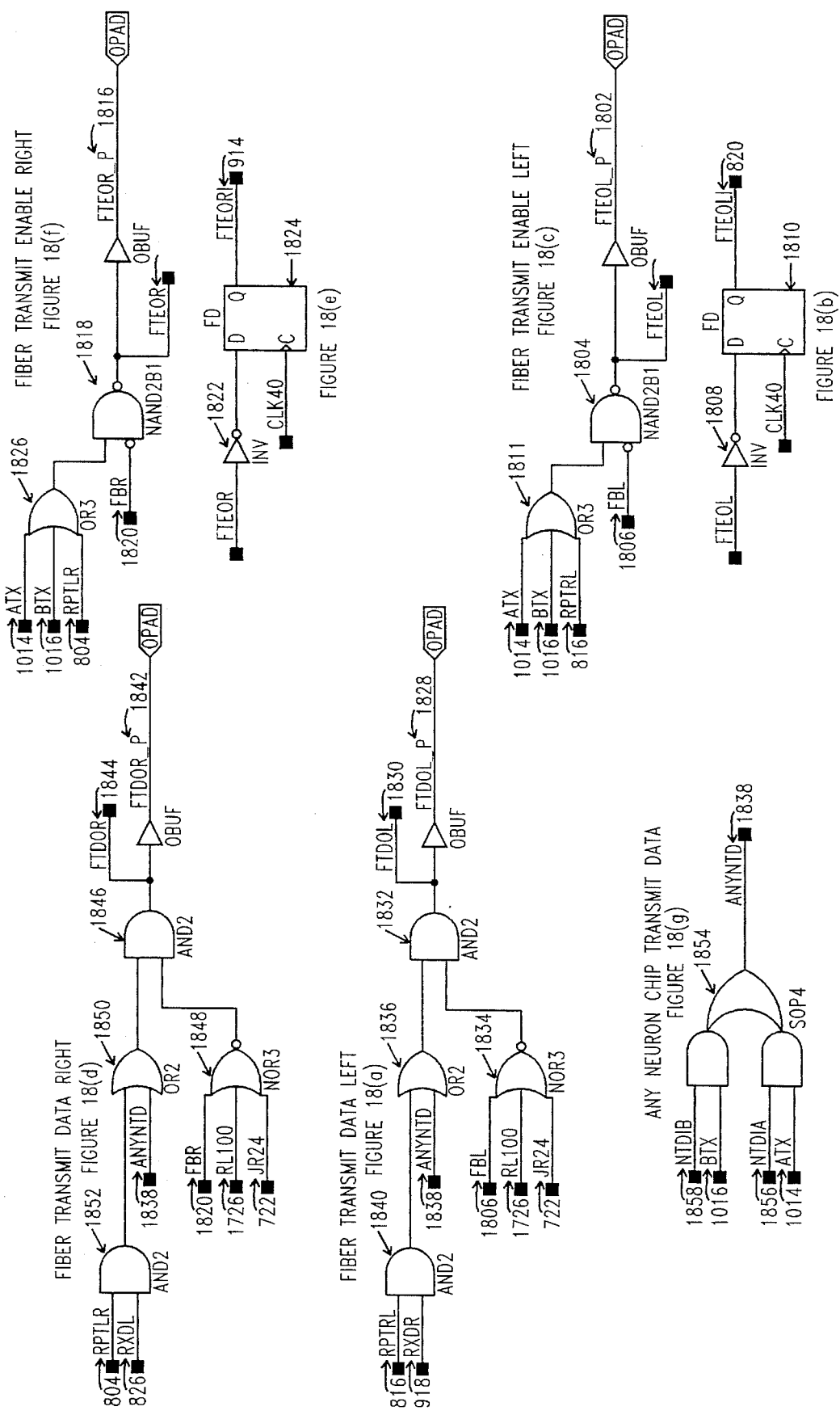
FIG. 18 is a logic diagram of a fiber transmit data path logic circuit of the transceiver of FIG. 4.
Figure 19:
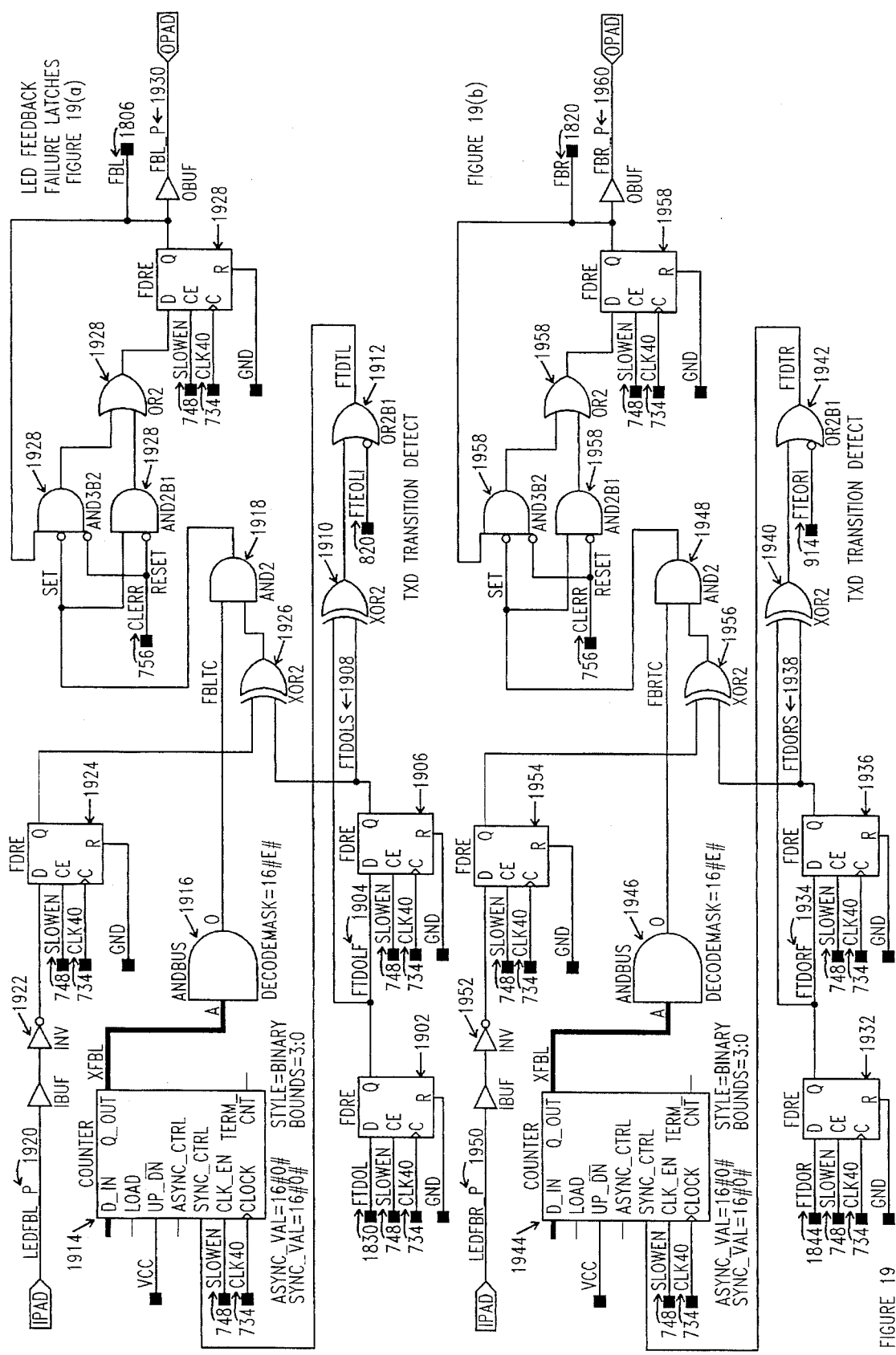
FIG. 19 is a logic diagram of a transmit feedback failure detection circuit of the transceiver of FIG. 4.

FIG. 18 describes the logic which controls the transmit enables and data for the fiber optic transmitters 508. Signal 1802 FTEOL_P is the transmit enable for the left side fiber optic transmitter, and is active low. This signal is generated by NAND gate 1804. NAND gate 1804 will be disabled if signal 1806 FBL is asserted (a transmit feedback failure has been detected on the left). The output of NAND gate 1804 is also inverted by inverter 1808 to convert the logic level to active high, and pipeline through register 1810 to generate signal 820 FTEOLI, which is used by the transmit feedback failure and repeater circuits. Assuming that signal 1806 FBL is negated, OR gate 1811 will control the output of NAND gate 1804. Thus signal 1802 FTEOL_P will assert if signal 1014 ATX is asserted (processor #1 is transmitting), BTX is asserted (processor #2 is transmitting), or signal 816 RPTRL is asserted (the SFT 210 is repeating from right-to-left).

Signal 1816 FTEOR_P is the transmit enable for the right side fiber optic transmitter, and is active low. This signal is generated by NAND gate 1818. NAND gate 1818 will be disabled if signal 1820 FBR is asserted (a transmit feedback failure has been detected on the right). The output of NAND gate 1818 is also inverted by inverter 1822 to convert the logic level to active high, and pipelined through register 1824 to generate signal 914 FTEORI, which is used by the transmit feedback failure and repeater circuits. Assuming that signal 1820 FBR is negated, OR gate 1826 will control the output of NAND gate 1818. Thus signal 1816 FTEOR_P will assert if signal 1014 ATX is asserted (processor #1 is transmitting), BTX is asserted (processor #2 is transmitting), or signal 804 RPTLR is asserted (the SFT 210 is repeating from left-to-right).

Signal 1828 FTDOL_P is the left fiber transmit data output from the SFC logic, and it is a buffered copy of signal 1820 FTDOL. The signal 1820 FTDOL is generated from AND gate 1832. AND gate 1832 can be disabled by NOR gate 1834, and this will happen if signal 1806 FBL is asserted (a transmit feedback failure has been detected on the left), signal 1726 RL100 is asserted (a receive too long condition has been detected), or if signal 722 JR24 is asserted (a jam condition has been detected). Assuming that NOR gate 1834 is not disabling AND gate 1832, the output of AND gate 1832 will be controlled by OR gate 1836. OR gate 1836 will provide data to AND gate 1832 if data is present on signal 1838 ANYNTD which is data from either processor #1 or processor #2. Also OR gate 1836 will provide data to AND gate 1832 if data is available from AND gate 1840. Data will be available on AND gate 1840 when signal 816 RPTRL is asserted (the SFT 210 is repeating from right-to-left) and data is present in signal 918 RXDR (data from the right receiver).

Signal 1842 FTDOR_P is the right fiber transmit data output from the SFC logic, and it is a buffered copy of Signal 1844 FTDOR. The signal 1844 FTDOR is generated from AND gate 1846. AND gate 1846 can be disabled by NOR gate 1848, and this will happen if signal 1820 FBR is asserted (a transmit feedback failure has been detected on the right), signal 1726 RL100 is asserted (a receive too long condition has been detected). or if signal 722 JR24 is asserted (a jam condition has been detected). Assuming that NOR gate 1848 is not disabling AND gate 1846, the output of AND gate 1846 will be controlled by OR gate 1850. OR gate 1850 will provide data to AND gate 1846 if data is present on signal 1838 ANYNTD which is data from either processor #1 or processor #2. Also OR gate 1850 will provide data to AND gate 1846 if data is available from AND gate 1852. Data will be available on AND gate 1852 when signal 804 RPTLR is asserted (the SFT 210 is repeating from left-to-right) and data is present in signal 826 RXDL (data from the left receiver).

Sum of products gate 1854 is used to generate the signal 1838 ANYNTD, which is data from processor #1 or processor #2. Signal 1838 ANYNTD will assert if signals 1014

ATX (processor #1 transmit enable) and 1856 NTDIA (processor #1 transmit data) are asserted, or if signals 1016 BTX (processor #2 transmit enable) and 1858 NTDIB (processor #2 transmit data) are asserted.

Transmit Feedback Failure Detection

This circuit 512 monitors the transmitted data, and compares this to a feedback signal from the fiber optic transmitter 508. A delay is introduced into the comparison to compensate for the propagation delay of the data through the fiber optic transmitter 508 to the feedback signal. A separate feedback failure detect circuit 512 is provided for both the left and right transmitters, since both sides can be transmitting simultaneously.

Signal 1830 FTDOL is pipelined through register 1902 to generate signal 1904 FTDOLF. This delayed by another register 1906 to create signal 1908 FTDOLS. The signal 1904 FTDOLF and its delayed counterpart 1908 FTDOLS are connected to XOR gate 1910 which will then operate as a transition detector for signal 1904 FTDOLF. The output of transition detector XOR gate 1910 is connected to OR gate 1912. The OR gate 1912 is wired such that the output will be forced high if the other input which is connected to signal 820 FTEOLI is negated. Thus the output of OR gate 1912 will be asserted while the left transmitter is not enabled and otherwise assert once each time an edge is detected while the left side is transmitting. This output of OR gate 1912 is wired to the reset input of counter 1914. Counter 1914 is a 4 bit binary synchronous counter, configured to clock every second clock cycle as controlled by signal 748 SLOWEN. Thus the counter 1914 will be held in reset (at count 0) while the left side is not transmitting, and otherwise will reset to count 0 each time an edge is detected in the transmitted data.

The decoder 1916 decodes count 14 of counter 1914. Since the counter 1914 is enabled every second clock cycle, this count will be reached 700 ns after each transition is detected in the receive data. The output of decoder 1916 thus enables AND gate 1918 700 ns after each transmit data transition.

The feedback signal from the transmitter 508 is connected to signal 1920 LEDFBL_P. In the current embodiment the feedback signal is inverted, so inverter 1922 is used to invert the feedback signal, and this is in turn synchronized through register 1924. The output from register 1924 is compared with the transmit data signal 1908 FTDOLS using XOR gate 1926. The result of the comparison is sampled 700 ns after the transmit data edge occurred using AND gate 1918. If at 700ns after the transmit data edge the feedback signal comparison with the transmit data signal fails, then the resulting output from AND gate 1918 will cause set-reset flip-flop 1928 to be set. This asserts signal 1806 FBL, which indicates a transmit feedback failure. This is further buffered and provided as signal 1930 FBL_P, which can be monitored by a processor #1, #2. The flip-flop 1928 is reset by signal 756 CLERR which has been described previously.

Signal 1844 FEDOR is pipelined through register 1932 to generate signal 1934 FTDORF. This delayed by another register 1936 to create signal 1938 FTDORS. The signal 1934 FTDORF and its delayed counterpart 1938 FTDORS are connected to XOR gate 1940 which will then operate as a transition detector for signal 1934 FTDORF. The output of transition detector XOR gate 1940 is connected to OR gate 1942. The OR gate 1942 is wired such that the output will be forced high if the other input which is connected to signal 914 FTEORI is negated. Thus the output of OR gate 1942 will be asserted while the right transmitter 508R is not enabled, and otherwise assert once each time an edge is detected while the right side is transmitting. This output of OR gate 1942 is wired to the reset input of counter 1944. Counter 1944 is a 4 bit binary synchronous counter, configured to clock every second clock cycle as controlled by signal 748 SLOWEN. Thus the counter 1944 will be held in reset (at count 0) while the right side is not transmitting, and otherwise will reset to count 0 each time an edge is detected in the transmitted data.

The decoder 1946 decodes count 14 of counter 1944. Since the counter 1944 is enabled every second clock cycle, this count will be reached 700 ns after each transition is detected in the receive data. The output of decoder 1946 thus enables AND gate 1948 700 ns after each transmit data transition.

The feedback signal from the transmitter 508 is connected to signal 1950 LEDFBR_P. In the current embodiment the feedback signal is inverted, so inverter 1952 is used to invert the feedback signal, and this is in turn synchronized through register 1954. The output from register 1925 is compared with the transmit data signal 1938 FTDOLS using XOR gate 1956. The result of the comparison is sampled 700 ns after the transmit data edge occurred using AND gate 1948, if at 700ns after the transmit data edge the feedback signal comparison with the transmit data signal fails, then the resulting output from AND gate 1948 will cause set-reset flip-flop 1958 to be set. This asserts signal 1820 FBR, which indicates a transmit feedback failure. This is further buffered and provided as signal 1960 FBR_P, which can be monitored by a processor #1, #2. The flip-flop 1958 is reset by signal 756 CLERR which has been described previously.

Processor Data Interface

Figure 20:
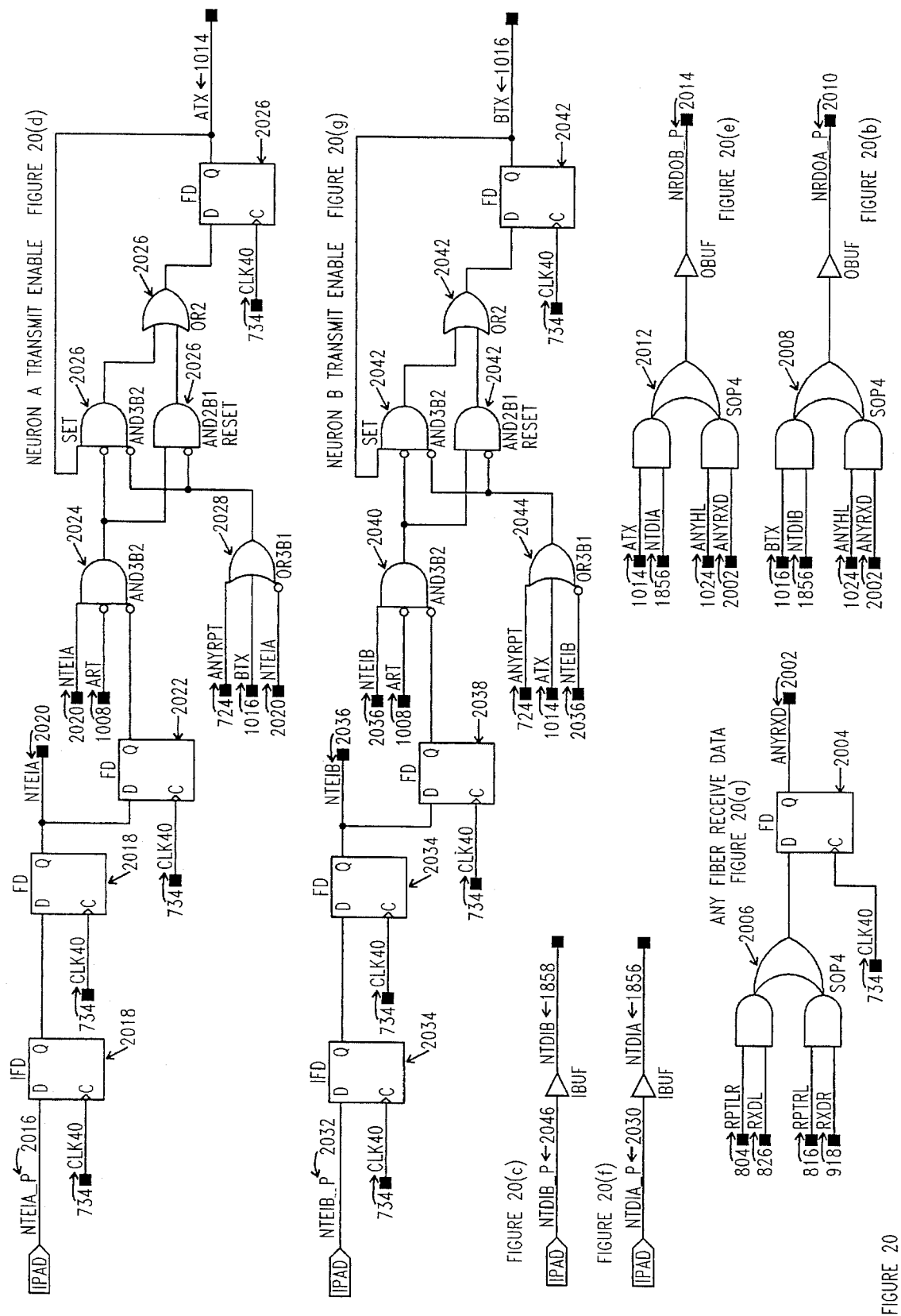
FIG. 20 is a processor data interface circuit of the transceiver of FIG. 4.

FIG. 20 describes the logic needed to interface both transmit and receive data to both processor #1 and processor #2. Note that in addition to routing data between the processors #1, #2 and the single fiber network, the SFT 210 must also route data between processors #1, #2. Signal 2002 ANYRXD is regenerated receive data from either the left or right repeater. Signal 2002 ANYRXD is provided by pipeline register 2004, which has its D input connected to the output of sum of products gate 2006. This sum of products gate will provide data to pipeline register 2004 if the signal 804 RPTLR is asserted (the SFT 210 is repeating from left to right) and there is data on signal 826 RXDL (regenerated data from the left), or if the signal 816 RPTRL is asserted (the SFT 210 is repeating from right to left) and there is data on signal 918 RXDR (regenerated data from the right).

Signal 2002 ANYRXD, which is receive data from either channel, is routed to processor #1 via sum of products gate 2008 and signal 2010 NRDOA_P. The signal 2010 NRDOA_P will have data for processor #1 from the single fiber network if signal 1024 ANYHL is asserted (valid data is being received) and data is on signal 2002 ANYRXD, or if signal 1016 BTX is asserted (processor #2 is transmitting) and data is on signal 1858 NTDIB (data from processor #2).

Signal 2002 ANYRXD, which is receive data from either channel, is routed to processor #2 via sum of products gate 2012 and signal NRDQA_P. The signal 2012 NRDOA_P will have data for processor #2 from the single fiber network if signal 1024 ANYHL is asserted (valid data is being received) and data is on signal 2002 ANYRXD, or if signal 1014 ATX is asserted (processor #1 is transmitting) and data is on signal 1858 NTDIB (data from processor #1).

When processor #1 desires to transmit, it will assert its transmit enable signal. In the current embodiment of the SFT 210 this signal is active high. Thus, processor #1 will assert signal 2016 NTEIA_P, which will then be synchronized by dual stage synchronizer 2018. Note that it is not required to have a processor connected to the signal 2016 NTEIA_P. In this case the signal 2016 NTEIA_P would be wired to a low logic level to prevent interference with the SFT 210 operation. The output from synchronizer 2018 is signal 2020 NTEIA, which is delayed using register 2022 to permit the detection of the rising edge of signal 2020 NTEIA at AND gate 2024. AND gate 2024 is provided to set-reset flip-flop 2026, which drives signal 1014 ATX. Flip-flop 2026 will be reset or held in reset by OR gate 2028 if signal 724 ANYRPT is asserted (the SFT 210 is repeating in either direction), the signal 1016 BTX is asserted (processor #2 is transmitting), or the signal 2020 NTEIA is asserted (processor #1 has finished transmitting). Flip-flop 2026 will set if signal 1008 ART is negated (the anti-recirculation timer has expired) and a positive edge is detected on signal 2020 NTEIA. While processor #1 is transmitting, it will provide transmit data to the SFT 210 via signal 2030 NTDIA_P, which is buffered to become signal 1856 NTDIA.

When processor #2 desires to transmit, it will assert its transmit enable signal. In the current embodiment of the SFT 210 this signal is active high. Thus, processor #2 will assert signal 2032 NTEIB_P, which will then be synchronized by dual stage synchronizer 2034. Note that it is not required to have a processor connected to the signal 2032 NTEIB_P. In this case the signal 2032 NTEIB_P would be wired to a low logic level to prevent interference with the SFT 210 operation. The output from synchronizer 2034 is signal 2036 NTEIB, which is delayed using register 2038 to permit the detection of the rising edge of signal 2036 NTEIB at AND gate 2040. AND gate 2040 is provided to set-reset flip-flop 2042, which drives signal 1016 BTX. Flip-flop 2042 will be reset or held in reset by OR gate 2044 if signal 724 ANYRE is asserted (the SFT 210 is repeating in either direction), the signal 1014 ATX is asserted (processor #1 is transmitting), or the signal 2036 NTEIB is asserted (processor #2 has finished transmitting). Flip-flop 2042 will set if signal 1008 ART is negated (the anti-recirculation timer 516 has expired) and a positive edge is detected on signal 2036 NTEIB. While processor #2 is transmitting, it will provide transmit data to the SFT 210 via signal 2046 NTDIB_P, which is buffered to become signal 1858 NTDIB.

It will be understood by those skilled in the art that this description is made with reference to the preferred embodiment and that it is possible to make other embodiments employing the principles of the invention which fall within its spirit and scope as defined by the following claims.

We claim:

1. A single fiber transceiver for use in a first node connected to a second node and a third node in a loop topology network communicating with serial data encoded in packets with an end of packet code, the transceiver comprising:

a single fiber first receiver for receiving serial data from the second node, receive data path logic, the first receiver further for passing received serial data to the receive data path logic, the receive data path logic for determining if the serial data received from the first receiver is valid, transmit data path logic, the receive data path logic for passing valid serial data to the transmit data path logic, a single fiber first transmitter for transmitting serial data, the transmit data path logic for passing the valid serial data to the first transmitter and enabling the first transmitter to transmit the valid serial data to the third node, and an anti-recirculation timer for preventing the receiver data path logic from passing valid serial data within a given period of time greater than a maximum amount of time that serial data takes to circulate once about the loop network following receipt of an end of packet code.

2. The transceiver of claim 1, further for connection to a processor for transmitting serial data to the transmit data path logic, wherein the anti-recirculation timer is further for preventing the receiver data path logic from passing valid serial data within a given period of time greater than a maximum amount of time that serial data takes to circulate about the loop network following transmission of an end of packet code to the transmit data path logic.

3. The transceiver of claim 2, wherein the serial data is Manchester encoded in order to provide an end of packet Manchester code violation which is an end of packet code.

4. The transceiver of claim 3, further comprising a processor with a serial communications controller for transmitting the serial data and for receiving the serial data.

5. The transceiver of claim 3, wherein the bit rate is set to 1.25 MHz.

6. The transceiver of claim 5 further comprising a processor with a serial communications controller for transmitting the serial data and for receiving the serial data.

7. The transceiver of claim 2 wherein the anti-recirculation timer comprises a digital counter that (a) is reset to zero count when a receive data transition occurs or when the transmitter is enabled, and (b) is permitted to count when no receive data transition occurs and when the transmitter is disabled and the counter is not yet at its terminal count, and wherein the timer prevents the receive data path logic from acknowledging receive data as the start of a new packet, until the counter is at its terminal count.

8. The transceiver of claim 7 wherein the anti-recirculation timer is configured to allow selection of different terminal count values to permit the given time period to be adjusted according to the actual loop propagation delay in a given single fiber network installation.

9. The transceiver of claim 1, wherein the serial data is Manchester encoded in order to provide an end of packet Manchester code violation which is an end of packet code.

10. The transceiver of claim 9, wherein the bit rate is 1.25 MHz.

11. The transceiver of claim 1 wherein the anti-recirculation timer comprises a digital counter that (a) is reset to zero count when a receive data transition occurs or when the transmitter is enabled, and (b) is permitted to count when no receive data transition occurs and when the transmitter is disabled and the counter is not yet at its terminal count, and wherein the timer prevents the receive data path logic from acknowledging receive data as the start of a new packet, until the counter is at its terminal count.

12. The transceiver of claim 11 wherein the anti-recirculation timer is configured to allow selection of different terminal count values to permit the given time period to be adjusted according to the actual loop propagation delay in a given single fiber network installation.

13. A single fiber transceiver for use in a first node connected to a second node and a third node in a network communicating with serial data encoded in such a way as to have known pulse width relative to the bit period, the transceiver comprising:

a single fiber first receiver for receiving serial data from the second node, receive data path logic, the first receiver further for passing received serial data to the receive data path logic, the receive data path logic for determining if the serial data received from the first receiver is valid, transmit data path logic, the receive data path logic for passing valid serial data to the transmit data path logic, a single fiber first transmitter for transmitting serial data, the transmit data path logic for passing the valid serial data to the first transmitter and enabling the first transmitter to transmit data to the third node, and a pulse width distortion compensation circuit for recognizing a leading edge of a received pulse of serial data, sampling the serial data at multiples of one-half of the bit period from recognition of the pulse until a new leading edge, and reconstructing the serial data according to the samples.

14. The transceiver of claim 13, wherein the serial data is Manchester encoded to provide bits of known pulse width relative to the bit rate.

15. The transceiver of claim 14, wherein the bit rate is set to 1.25 MHz.

16. The transceiver of claim 15 wherein (a) the first receiver generates pulse width distortion in one direction only, (b) the pulse width distortion compensation circuit comprises a timer with a terminal count which is reached at a time corresponding to ½ of the bit period, (c) the timer is reset at an edge of the data pulse which precedes a shortened portion of the data pulse, and (d) the pulse width distortion compensation circuit samples the receive data when the counter reaches the terminal count, whereby a pulse width distortion compensated copy of the receive data is produced by the pulse width distortion compensation circuit.

17. The transceiver of claim 16, wherein the first receiver generates pulse width distortion to lengthen the pulse width of a positive going pulse, and the timer is reset at the falling edge of the data pulse.

18. The transceiver of claim 14 wherein (a) the first receiver generates pulse width distortion in one direction only, (b) the pulse width distortion compensation circuit comprises a timer with a terminal count which is reached at a time corresponding to ½ of the bit period, (c) the timer is reset at an edge of the data pulse which precedes a shortened portion of the data pulse, and (d) the pulse width distortion compensation circuit samples the receive data when the counter reaches the terminal count, whereby a pulse width distortion compensated copy of the receive data is produced by the pulse width distortion compensation circuit.

19. The transceiver of claim 18, wherein the first receiver generates pulse width distortion to lengthen the pulse width of a positive going pulse, and the timer is reset at the falling edge of the data pulse.

20. The transceiver of claim 13 wherein (a) the first receiver generates pulse width distortion in one direction only, (b) the pulse width distortion compensation circuit comprises a timer with a terminal count which is reached at a time corresponding to ½ of the bit period, (c) the timer is reset at an edge of the data pulse which precedes a shortened portion of the data pulse, and (d) the pulse width distortion compensation circuit samples the receive data when the counter reaches the terminal count, whereby a pulse width distortion compensated copy of the receive data is produced by the pulse width distortion compensation circuit.

21. The transceiver of claim 20, wherein the first receiver generates pulse width distortion to lengthen the pulse width of a positive going pulse, and the timer is reset at the falling edge of the data pulse.

22. A single fiber transceiver for use in a first node connected to a second node and a third node in a network communicating with serial data encoded in such a way as to have known pulse width relative to the bit period, the transceiver comprising:

a single fiber first receiver for receiving serial data from the second node, receive data path logic, the first receiver further for passing received serial data to the receive data path logic, the receive data path logic for determining if the serial data received from the first receiver is valid, transmit data path logic, the receive data path logic for passing valid serial data to the transmit data path logic, a single fiber first transmitter for transmitting serial data, the transmit data path logic for passing the valid serial data to the first transmitter and enabling the first transmitter to transmit data to the third node, a weak link detection circuit for determining the optical power at the receiver by converting the amplitude of the received serial data to a corresponding amount of pulse width distortion introduced into the received data and measuring the magnitude of the distortion.

23. The transceiver of claim 22, wherein the serial data is Manchester encoded to provide bits of known pulse width relative to the bit rate.

24. The transceiver of claim 23, wherein the bit rate is see to 1.25 MHz.

25. The transceiver of claim 24 wherein the first receiver generates pulse width distortion which has a magnitude proportional to the incoming signal strength, and the weak link detection circuit comprises: (a) a timer with a terminal count which is reached at a time corresponding to ½ of the bit period, and is reset at an edge of the data pulse which precedes a shortened portion of the distorted pulse, (b) a magnitude comparator which compares a timer value of the timer to an arbitrary threshold value, and (c) a weak link indication latch which sets if the magnitude comparator indicates a timer value failing the threshold value at the point in time when the edge of the data pulse which follows the shortened portion of the distorted pulse occurs.

26. The transceiver of claim 23 wherein the first receiver generates pulse width distortion which has a magnitude proportional to the incoming signal strength, and the weak link detection circuit comprises: (a) a timer with a terminal count which is reached at a time corresponding to ½ of the bit period, and is reset at an edge of the data pulse which precedes a shortened portion of the distorted pulse, (b) a magnitude comparator which compares a timer value of the timer to an arbitrary threshold value, and (c) a weak link indication latch which sets if the magnitude comparator indicates a timer value failing the threshold value at the point in time when the edge of the data pulse which follows the shortened portion of the distorted pulse occurs.

27. The transceiver of claim 22 wherein the first receiver generates pulse width distortion which has a magnitude proportional to the incoming signal strength, and the weak link detection circuit comprises: (a) a timer with a terminal count which is reached at a time corresponding to ½ of the bit period, and is reset at an edge of the data pulse which precedes a shortened portion of the distorted pulse, (b) a magnitude comparator which compares a timer value of the timer to an arbitrary threshold value, and (c) a weak link indication latch which sets if the magnitude comparator indicates a timer value failing the threshold value at the point in time when the edge of the data pulse which follows the shortened portion of the distorted pulse occurs.

28. A single fiber transceiver for use in a first node connected to a second node and a third node in a network communicating with serial data encoded in such a way as to have a known bit rate, the transceiver comprising:

a single fiber first receiver for receiving serial data from the second node, receive data path logic, the first receiver further for passing received serial data to the receive data path logic, the receive data path logic for determining if the serial data received from the first receiver is valid, transmit data path logic, the receive data path logic for passing valid serial data to the transmit data path logic, a single fiber first transmitter for transmitting serial data, the transmit data path logic for passing the valid serial data to the first transmitter and enabling the first transmitter to transmit data to the third node, and a phase locked loop for removing jitter from the received serial data by using a local frequency generator to sample the received data and to regenerate the data based on the samples of the received data, the frequency generator providing feedback signals to phase detectors that compare the phase of the frequency generator to the phase of the received data and can accordingly force the frequency generator to adjust its phase to more closely match that of the received data.

29. The transceiver of claim 28, wherein the bit rate is 1.25 MHz.

* * * * *